(12) United States Patent
McSheffrey

(10) Patent No.: US 9,747,569 B2
(45) Date of Patent: *Aug. 29, 2017

(54) FLUID CONTAINER RESOURCE MANAGEMENT

(71) Applicant: en-Gauge, Inc., Rockland, MA (US)

(72) Inventor: Brendan T. McSheffrey, Newton, MA (US)

(73) Assignee: en-Gauge, Inc., Rockland, MA (US)

( * ) Notice: Subject to any disclaimer, the term of this patent is extended or adjusted under 35 U.S.C. 154(b) by 207 days.

This patent is subject to a terminal disclaimer.

(21) Appl. No.: 14/719,987

(22) Filed: May 22, 2015

(65) Prior Publication Data

US 2015/0332193 A1    Nov. 19, 2015

Related U.S. Application Data

(63) Continuation of application No. 13/358,637, filed on Jan. 26, 2012, now Pat. No. 9,041,534.

(Continued)

(51) Int. Cl.
*G08B 1/08*    (2006.01)
*G06Q 10/06*    (2012.01)
(Continued)

(52) U.S. Cl.
CPC ....... *G06Q 10/06315* (2013.01); *A62C 13/76* (2013.01); *A62C 37/50* (2013.01); *F17C 13/02* (2013.01); *F17C 13/025* (2013.01); *G08B 21/182* (2013.01); *F17C 2205/013* (2013.01); *F17C 2221/011* (2013.01);
(Continued)

(58) Field of Classification Search
CPC ............... F17C 13/02; F17C 2205/013; F17C 2250/034; F17C 2250/0491; F17C 2250/0478; F17C 2250/077; F17C 2270/02; F17C 13/025; G08B 21/182; A62C 13/76; A62C 37/50
See application file for complete search history.

(56) References Cited

U.S. PATENT DOCUMENTS 50,581 A    10/1865    Henis
558,643 A    4/1896    Fennessy
(Continued)

FOREIGN PATENT DOCUMENTS

DE    3731793    3/1989
FR    2340109    9/1977
(Continued)

OTHER PUBLICATIONS

"Oxygen Cylinder Storage Requirements", Mar. 20, 2008, Accreditation Monthly, http://www.hcpro.comtprint/ACC-207757-1000/Oxygen-Cylinder-Storage-Requirements.html Mar. 20, 2008 , pp. 1-2.
(Continued)

*Primary Examiner* — Laura Martin
*Assistant Examiner* — Samir M Shah
(74) *Attorney, Agent, or Firm* — Strategic Patents, P.C.

(57) ABSTRACT

Fluid tanks in a hospital or similar environment include sensors to detect, e.g., state and location, which can be communicated to a central station where this data can be processed to permit predictions of resource usage and enable automated management of the fluid tanks.

20 Claims, 8 Drawing Sheets

Related U.S. Application Data

(60) Provisional application No. 61/436,425, filed on Jan. 26, 2011.

(51) Int. Cl.
*F17C 13/02* (2006.01)
*G08B 21/18* (2006.01)
*A62C 13/76* (2006.01)
*A62C 37/50* (2006.01)

(52) U.S. Cl.
CPC .. *F17C 2250/032* (2013.01); *F17C 2250/034* (2013.01); *F17C 2250/043* (2013.01); *F17C 2250/0478* (2013.01); *F17C 2250/0491* (2013.01); *F17C 2250/077* (2013.01); *F17C 2270/02* (2013.01)

(56) References Cited

U.S. PATENT DOCUMENTS

| | | |
|---|---|---|
| 768,109 A | 8/1904 | Ballard et al. |
| 922,456 A | 5/1909 | Casey |
| 1,825,367 A | 9/1931 | Schilling |
| 1,950,142 A | 3/1934 | Hastings et al. |
| 2,189,991 A | 2/1940 | Muller |
| 2,550,157 A | 4/1951 | Mazza |
| 2,670,194 A | 2/1954 | Hansson |
| 2,710,666 A | 6/1955 | May |
| 2,920,641 A | 1/1960 | Girolo |
| 3,145,375 A | 8/1964 | Webb |
| 3,283,578 A | 11/1966 | Moore |
| 3,333,641 A | 8/1967 | Hansom |
| 3,407,665 A | 10/1968 | Noakes et al. |
| 3,664,430 A | 5/1972 | Sitabkhan |
| 3,710,613 A | 1/1973 | Innes et al. |
| 3,735,376 A | 5/1973 | Kermer et al. |
| 3,773,145 A | 11/1973 | Drexler |
| 3,946,175 A | 3/1976 | Sitabkhan |
| 3,954,612 A | 5/1976 | Wilkerson |
| 4,003,048 A | 1/1977 | Weise |
| 4,015,250 A | 3/1977 | Fudge |
| 4,034,697 A | 7/1977 | Russell |
| 4,051,467 A | 9/1977 | Galvin |
| 4,100,537 A * | 7/1978 | Carlson ............... G08B 21/182 340/327 |
| 4,101,887 A | 7/1978 | Osborne |
| 4,119,153 A | 10/1978 | Avant |
| 4,125,084 A | 11/1978 | Salmonsen et al. |
| 4,143,545 A | 3/1979 | Sitabkhan |
| 4,184,377 A | 1/1980 | Hubbard |
| 4,227,577 A | 10/1980 | Iida |
| 4,246,046 A | 1/1981 | Lameyer |
| 4,279,155 A | 7/1981 | Balkanli |
| 4,289,207 A | 9/1981 | Wernert |
| 4,300,311 A | 11/1981 | Marchant |
| 4,303,395 A | 12/1981 | Bower |
| 4,342,988 A | 8/1982 | Thompson et al. |
| 4,360,802 A | 11/1982 | Pinto |
| 4,384,486 A | 5/1983 | Eckert |
| 4,418,336 A | 11/1983 | Taylor |
| 4,419,658 A | 12/1983 | Jarosz et al. |
| 4,436,414 A * | 3/1984 | Kamiyama ............ G03G 21/12 15/256.52 |
| 4,512,190 A | 4/1985 | Sledmere |
| 4,531,114 A | 7/1985 | Topol et al. |
| 4,548,274 A | 10/1985 | Simpson |
| 4,586,383 A | 5/1986 | Blomquist |
| 4,599,902 A | 7/1986 | Gray |
| 4,613,851 A | 9/1986 | Hines |
| 4,635,480 A | 1/1987 | Hrncir et al. |
| 4,697,643 A | 10/1987 | Sassier |
| 4,709,330 A | 11/1987 | Yokoi et al. |
| 4,805,448 A | 2/1989 | Armell |
| 4,823,116 A | 4/1989 | Kitchen, III et al. |
| 4,823,788 A | 4/1989 | Smith et al. |
| 4,833,469 A | 5/1989 | David |
| 4,835,522 A | 5/1989 | Andrejasich et al. |
| 4,866,423 A | 9/1989 | Anderson et al. |
| 4,887,291 A | 12/1989 | Stillwell |
| 4,890,677 A | 1/1990 | Scofield |
| 4,928,255 A | 5/1990 | Brennecke |
| 4,975,687 A | 12/1990 | Murphy, Jr. et al. |
| 4,979,572 A | 12/1990 | Mikulec |
| 5,020,367 A | 6/1991 | White |
| 5,027,871 A | 7/1991 | Guenther |
| 5,072,618 A | 12/1991 | Taylor et al. |
| 5,123,409 A * | 6/1992 | Sheffield ............... A62B 7/02 128/204.18 |
| 5,124,686 A | 6/1992 | White et al. |
| 5,153,567 A | 10/1992 | Chimento |
| 5,153,722 A | 10/1992 | Goedeke et al. |
| 5,224,051 A | 6/1993 | Johnson |
| 5,305,639 A | 4/1994 | Pontefract |
| 5,339,074 A | 8/1994 | Shindley et al. |
| 5,357,242 A | 10/1994 | Morgano et al. |
| 5,388,570 A | 2/1995 | Wassil |
| 5,400,246 A | 3/1995 | Wilson et al. |
| 5,457,995 A | 10/1995 | Staton et al. |
| 5,460,228 A | 10/1995 | Butler |
| 5,472,012 A | 12/1995 | Wood et al. |
| 5,475,614 A | 12/1995 | Tofte et al. |
| 5,479,820 A | 1/1996 | Fekete |
| 5,483,826 A | 1/1996 | Schultz et al. |
| 5,486,811 A | 1/1996 | Wehrle et al. |
| 5,534,851 A | 7/1996 | Russek |
| 5,578,993 A | 11/1996 | Sitabkhan et al. |
| 5,589,639 A | 12/1996 | D'Antonio et al. |
| 5,593,426 A | 1/1997 | Morgan et al. |
| 5,596,501 A | 1/1997 | Comer et al. |
| 5,613,778 A | 3/1997 | Lawson |
| 5,652,393 A | 7/1997 | Lawson |
| 5,706,273 A | 1/1998 | Guerreri |
| 5,728,933 A | 3/1998 | Schultz et al. |
| 5,775,430 A * | 7/1998 | McSheffrey ........... A62C 13/76 169/30 |
| 5,781,108 A | 7/1998 | Jacob et al. |
| 5,793,280 A | 8/1998 | Hincher |
| 5,808,541 A * | 9/1998 | Golden ................. A62C 37/40 169/26 |
| 5,816,224 A | 10/1998 | Welsh et al. |
| 5,829,465 A | 11/1998 | Garretson |
| 5,848,651 A * | 12/1998 | McSheffrey ........... A62C 13/76 169/51 |
| 5,853,244 A | 12/1998 | Hoff et al. |
| 5,864,287 A | 1/1999 | Evans, Jr. et al. |
| 5,874,899 A | 2/1999 | Barmore, Jr. et al. |
| 5,877,426 A | 3/1999 | Hay et al. |
| 5,936,531 A | 8/1999 | Powers |
| 5,952,919 A | 9/1999 | Merrill |
| 6,014,307 A | 1/2000 | Crimmins |
| 6,079,459 A * | 6/2000 | Klotz .................... F17C 5/002 141/18 |
| 6,104,301 A | 8/2000 | Golden |
| 6,114,823 A | 9/2000 | Doner et al. |
| 6,125,940 A | 10/2000 | Oram |
| 6,128,576 A | 10/2000 | Nishimoto et al. |
| 6,137,417 A * | 10/2000 | McDermott ............ G01L 19/12 128/202.22 |
| 6,141,584 A | 10/2000 | Rockwell et al. |
| 6,155,160 A | 12/2000 | Hochbrueckner |
| 6,168,563 B1 | 1/2001 | Brown |
| 6,240,365 B1 | 5/2001 | Bunn |
| 6,270,455 B1 | 8/2001 | Brown |
| 6,279,664 B1 | 8/2001 | Yanovsky et al. |
| 6,289,331 B1 | 9/2001 | Pedersen et al. |
| 6,301,501 B1 | 10/2001 | Cronin et al. |
| 6,302,218 B1 * | 10/2001 | McSheffrey ........... A62C 13/76 169/51 |
| 6,311,779 B2 | 11/2001 | McSheffrey et al. |
| 6,317,042 B1 | 11/2001 | Engelhorn et al. |
| 6,327,497 B1 | 12/2001 | Kirchgeorg et al. |
| 6,336,362 B1 | 1/2002 | Duenas |
| 6,351,689 B1 | 2/2002 | Carr et al. |

(56) References Cited

U.S. PATENT DOCUMENTS

| | | | |
|---|---|---|---|
| 6,357,292 B1* | 3/2002 | Schultz | B60C 23/009 73/146.5 |
| 6,401,713 B1 | 6/2002 | Hill et al. | |
| 6,450,254 B1 | 9/2002 | Hoyle et al. | |
| 6,488,099 B2 | 12/2002 | McSheffrey et al. | |
| 6,496,110 B2 | 12/2002 | Peterson et al. | |
| 6,522,531 B1 | 2/2003 | Quintana et al. | |
| 6,529,590 B1 | 3/2003 | Centers | |
| 6,542,076 B1 | 4/2003 | Joao | |
| 6,556,981 B2 | 4/2003 | Pedersen et al. | |
| 6,567,006 B1 | 5/2003 | Lander et al. | |
| 6,585,055 B2* | 7/2003 | Mcsheffrey | A62C 13/76 169/23 |
| 6,587,049 B1 | 7/2003 | Thacker | |
| 6,598,454 B2 | 7/2003 | Brazier et al. | |
| 6,646,545 B2 | 11/2003 | Bligh | |
| 6,647,762 B1 | 11/2003 | Roy | |
| 6,735,473 B2 | 5/2004 | Kolder et al. | |
| 6,766,688 B2 | 7/2004 | O'Shea | |
| 6,772,260 B2 | 8/2004 | Kawase et al. | |
| 6,794,991 B2* | 9/2004 | Dungan | G01N 33/0073 340/539.19 |
| 6,853,309 B1 | 2/2005 | Schröter | |
| 6,856,251 B1* | 2/2005 | Tietsworth | B67D 1/0075 340/539.26 |
| 6,866,042 B2* | 3/2005 | Izuchukwu | A61M 16/0677 128/201.13 |
| 6,980,110 B1* | 12/2005 | Hoben | A47G 29/1214 340/533 |
| 6,987,448 B2* | 1/2006 | Catton | A61M 16/0051 128/903 |
| 6,989,731 B1* | 1/2006 | Kawai | G05B 19/0428 340/3.1 |
| 6,995,662 B2* | 2/2006 | Wortsmith | B63B 49/00 340/431 |
| 7,081,815 B2 | 7/2006 | Runyon et al. | |
| 7,088,227 B2* | 8/2006 | Ward | G01L 19/12 303/3 |
| 7,111,510 B2 | 9/2006 | Tadoa et al. | |
| 7,174,769 B2* | 2/2007 | McSheffrey, Jr. | G08B 25/10 169/75 |
| 7,174,783 B2 | 2/2007 | McSheffrey, Jr. et al. | |
| 7,188,679 B2 | 3/2007 | McSheffrey et al. | |
| 7,245,030 B2 | 7/2007 | Nelson et al. | |
| 7,271,704 B2 | 9/2007 | McSheffrey et al. | |
| 7,289,881 B2 | 10/2007 | Ota et al. | |
| 7,375,619 B2* | 5/2008 | Auerbach | E05B 39/00 340/426.15 |
| 7,397,364 B2* | 7/2008 | Govari | A61B 5/06 340/13.27 |
| 7,450,020 B2 | 11/2008 | McSheffrey et al. | |
| 7,574,911 B2 | 8/2009 | McSheffrey et al. | |
| 7,726,411 B2 | 6/2010 | McSheffrey, Jr. et al. | |
| 7,728,715 B2 | 6/2010 | Riedel et al. | |
| 7,891,241 B2 | 2/2011 | McSheffrey et al. | |
| 7,891,435 B2 | 2/2011 | McSheffrey et al. | |
| 7,895,884 B2* | 3/2011 | McSheffrey, Jr. | G08B 25/10 169/75 |
| 7,961,089 B2 | 6/2011 | McShefferey et al. | |
| 8,009,020 B2 | 8/2011 | Riedel et al. | |
| 8,607,617 B2* | 12/2013 | McSheffrey, Jr. | G08B 25/10 340/539.22 |
| 2001/0025713 A1* | 10/2001 | Mcsheffrey | A62C 37/50 169/75 |
| 2001/0052681 A1 | 12/2001 | Deavila | |
| 2003/0034885 A1* | 2/2003 | Catton | A61M 16/0051 340/506 |
| 2003/0071736 A1* | 4/2003 | Brazier | F17C 13/02 340/614 |
| 2003/0116329 A1* | 6/2003 | McSheffrey | A61N 1/39 169/30 |
| 2003/0135324 A1 | 7/2003 | Navab | |
| 2003/0189492 A1* | 10/2003 | Harvie | A61M 16/0051 340/573.1 |
| 2004/0017471 A1 | 1/2004 | Suga et al. | |
| 2004/0123486 A1 | 7/2004 | Hameed et al. | |
| 2004/0194980 A1* | 10/2004 | McSheffrey, Jr. | G08B 25/10 169/75 |
| 2004/0200058 A1 | 10/2004 | Fish | |
| 2004/0265134 A1 | 12/2004 | Iimura et al. | |
| 2005/0006109 A1* | 1/2005 | McSheffrey | A61N 1/39 169/75 |
| 2005/0124315 A1 | 6/2005 | Kageyama et al. | |
| 2005/0174091 A1 | 8/2005 | Dayan et al. | |
| 2005/0185606 A1 | 8/2005 | Rayment et al. | |
| 2006/0027547 A1 | 2/2006 | Silvestro | |
| 2006/0036515 A1 | 2/2006 | Ingalsbe et al. | |
| 2006/0074513 A1 | 4/2006 | DeRose et al. | |
| 2006/0131393 A1 | 6/2006 | Cok et al. | |
| 2007/0050137 A1 | 3/2007 | Woon et al. | |
| 2008/0004798 A1 | 1/2008 | Troxler et al. | |
| 2008/0048826 A1* | 2/2008 | Agrawal | G06F 19/327 340/5.61 |
| 2008/0232604 A1 | 9/2008 | Dufresne et al. | |
| 2008/0313255 A1 | 12/2008 | Geltner et al. | |
| 2010/0171624 A1 | 7/2010 | McSheffrey et al. | |
| 2010/0192695 A1 | 8/2010 | McSheffrey et al. | |
| 2010/0245570 A1 | 9/2010 | Riedel et al. | |
| 2011/0109454 A1 | 5/2011 | Mcsheffrey, Sr. et al. | |
| 2011/0241873 A1 | 10/2011 | Mcsheffrey et al. | |
| 2011/0285847 A1 | 11/2011 | Riedel et al. | |
| 2012/0188076 A1 | 7/2012 | Mcsheffrey | |

FOREIGN PATENT DOCUMENTS

| | | |
|---|---|---|
| FR | 2515845 | 5/1983 |
| FR | 2676931 | 12/1992 |
| WO | WO-81/02484 | 9/1981 |
| WO | WO-94/11853 | 5/1994 |
| WO | WO-01/46780 | 6/2001 |
| WO | WO-01/93220 | 12/2001 |
| WO | WO-03/076765 | 9/2003 |
| WO | WO-03/098908 | 11/2003 |

OTHER PUBLICATIONS

"U.S. Appl. No. 12/716,366, Non-Final Office Action mailed Sep. 15, 2010", Sep. 15, 2010, 12 pages.

"NFPA 10 Standard for Portable Fire Extinguishers", Nat'l Fire Protection Assoc. 1998 Edition, Jul. 14, 2005, pp. 10.

"Help That Comes Too Late Is As Good As No Help At All—The Fire Extinguisher Alarm System Gives Immediate Help", Invention Technologies, Inc. Press Release, Jun. 3, 2005, 1 page.

"U.S. Appl. No. 12/684,344, Non-Final Office Action mailed Apr. 27, 2011", Apr. 27, 2011, 23 pages.

"U.S. Appl. No. 11/856,618, Notice of Allowance mailed Feb. 3, 2011", Feb. 3, 2011, 5 pages.

"U.S. Appl. No. 10/614,948, Notice of Allowance mailed Dec. 8, 2010", 7 pages.

International Searching Authorit, "PCT/US2004/022019 International Search Report dated Dec. 6, 2004", 11 pages.

Canadian Patent Office, , "Canadian Application Serial No. 2,443,773, Office Action dated Dec. 10, 2008", 2 pages.

"U.S. Appl. No. 11/856,618, Non-Final Office Action mailed Sep. 28, 2010", Sep. 28, 2010, 6 pgs.

""Exciting new Products for Measuring Flow and Pressure"", Cole-Parmer Brochure Canada Apr. 23, 1996, 1 pg.

"U.S. Appl. No. 11/622,343, Notice of Allowance mailed Dec. 23, 2010", 9 pages.

"U.S. Appl. No. 13/358,637, Final Office Action mailed Oct. 23, 2014", 25 pages.

"U.S. Appl. No. 13/358,637, Non-Final Office Action mailed Jun. 11, 2014", 26 pages.

"U.S. Appl. No. 13/358,637, Notice of Allownace mailed Jan. 30, 2015", 12 pages.

(56) References Cited

OTHER PUBLICATIONS

"U.S. Appl. No. 11/622,343 Final Office Action mailed Jul. 22, 2010", 13 Pages.

* cited by examiner

FLUID CONTAINER RESOURCE MANAGEMENT

RELATED APPLICATIONS

This application is a continuation of U.S. patent application Ser. No. 13/358,637 filed on Jan. 26, 2012, which claims the benefit of U.S. Prov. Application No. 61/436,425 filed on Jan. 26, 2011, where each is hereby incorporated by reference herein in its entirety.

This application is also related to the following U.S. Patent applications, each of which is incorporated by reference in its entirety: U.S. application Ser. No. 11/856,618, filed Sep. 17, 2007; U.S. application Ser. No. 11/622,343, filed Jan. 11, 2007; U.S. application Ser. No. 10/863,668, filed Jun. 8, 2004 (now U.S. Pat. No. 7,271,704); U.S. application Ser. No. 10/782,288, filed Feb. 19, 2004 (now U.S. Pat. No. 7,174,769); U.S. application Ser. No. 10/614,948, filed Jun. 8, 2003 (now U.S. Pat. No. 7,891,435); U.S. application Ser. No. 10/274,606, filed Oct. 21, 2003 (now U.S. Pat. No. 7,188,679); U.S. application Ser. No. 09/832,531, filed Apr. 11, 2001 (now U.S. Pat. No. 6,585,055); U.S. application Ser. No. 09/212,121, filed Dec. 15, 1998 (now U.S. Pat. No. 6,302,218); U.S. application Ser. No. 08/879,445, filed Jun. 20, 1997 (now U.S. Pat. No. 5,848,651); U.S. application Ser. No. 08/590,411, filed Jan. 23, 1996 (now U.S. Pat. No. 5,775,430).

BACKGROUND

There remains a need for improved management of resources such as fire extinguishers, oxygen tanks, and other fluid containers within industrial/commercial settings.

SUMMARY

Fluid tanks in a hospital or similar environment include sensors to detect, e.g., state and location, which can be communicated to a central station where this data can be processed to permit predictions of resource usage and enable automated management of the fluid tanks.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
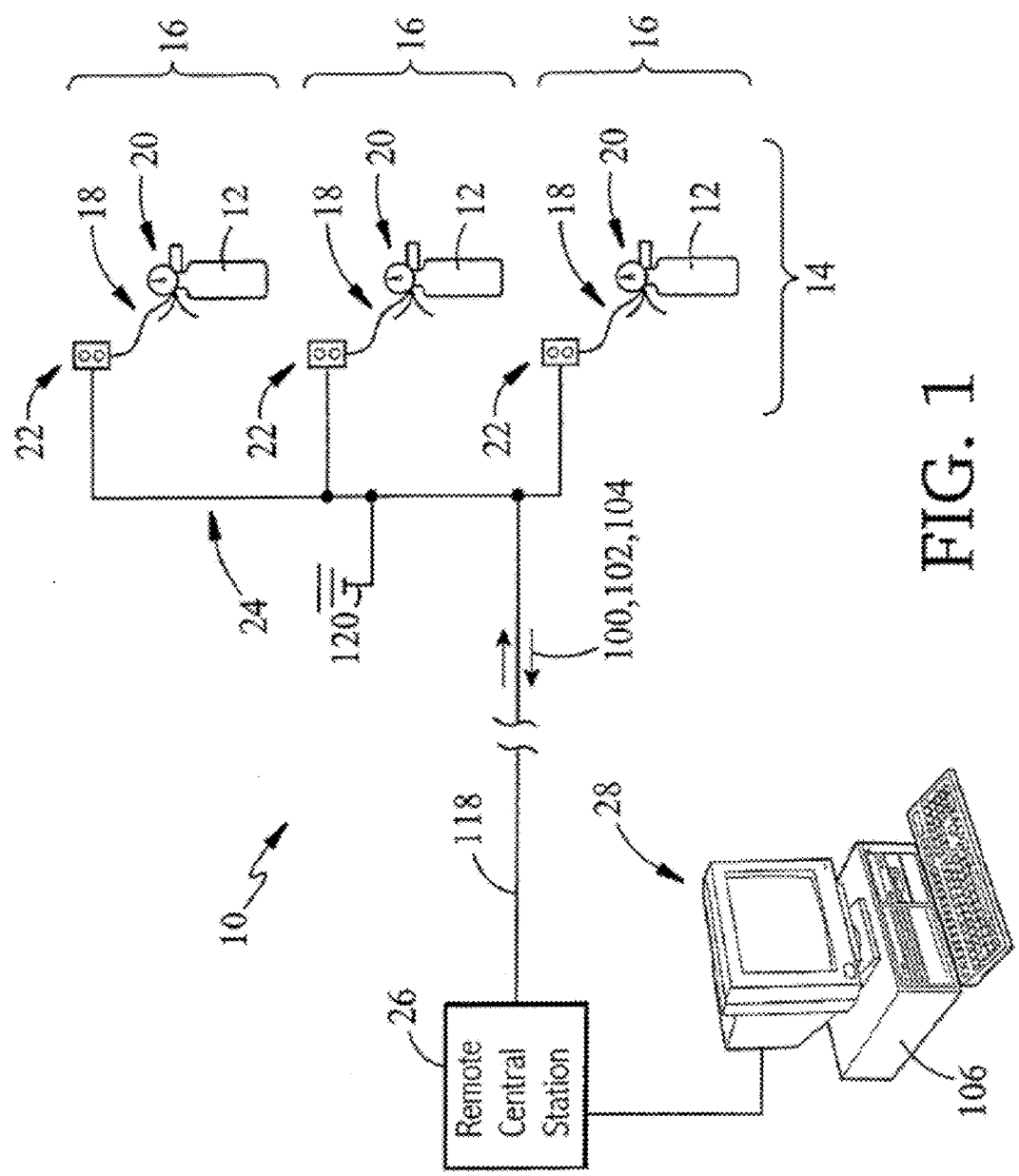
FIG. 1 is a somewhat diagrammatic view of an apparatus for remote inspection of portable pressurized tanks distributed at a system of stations, in this embodiment; fire extinguishers are distributed at a system of fire extinguisher stations.

Referring to FIG. 1, in one embodiment, an apparatus 10 for remote inspection of portable tanks inspects portable fire extinguishers 12 installed at one or a system 14 of fire extinguisher stations 16 includes means 18 for detecting lack of presence of a fire extinguisher 12 in its installed position at a fire extinguisher station 16, means 20 for detecting out-of-range pressure of the contents of a fire extinguisher 12 at a fire extinguisher station 16, means 22 for detecting an obstruction to viewing of or access to a fire extinguisher station 16, and means 24 for transmitting inspection report information for each of the fire extinguisher stations 16 to a remote central station 26. The apparatus 10 may further include means 28 for maintaining a record of inspection report information.

Figure 2:
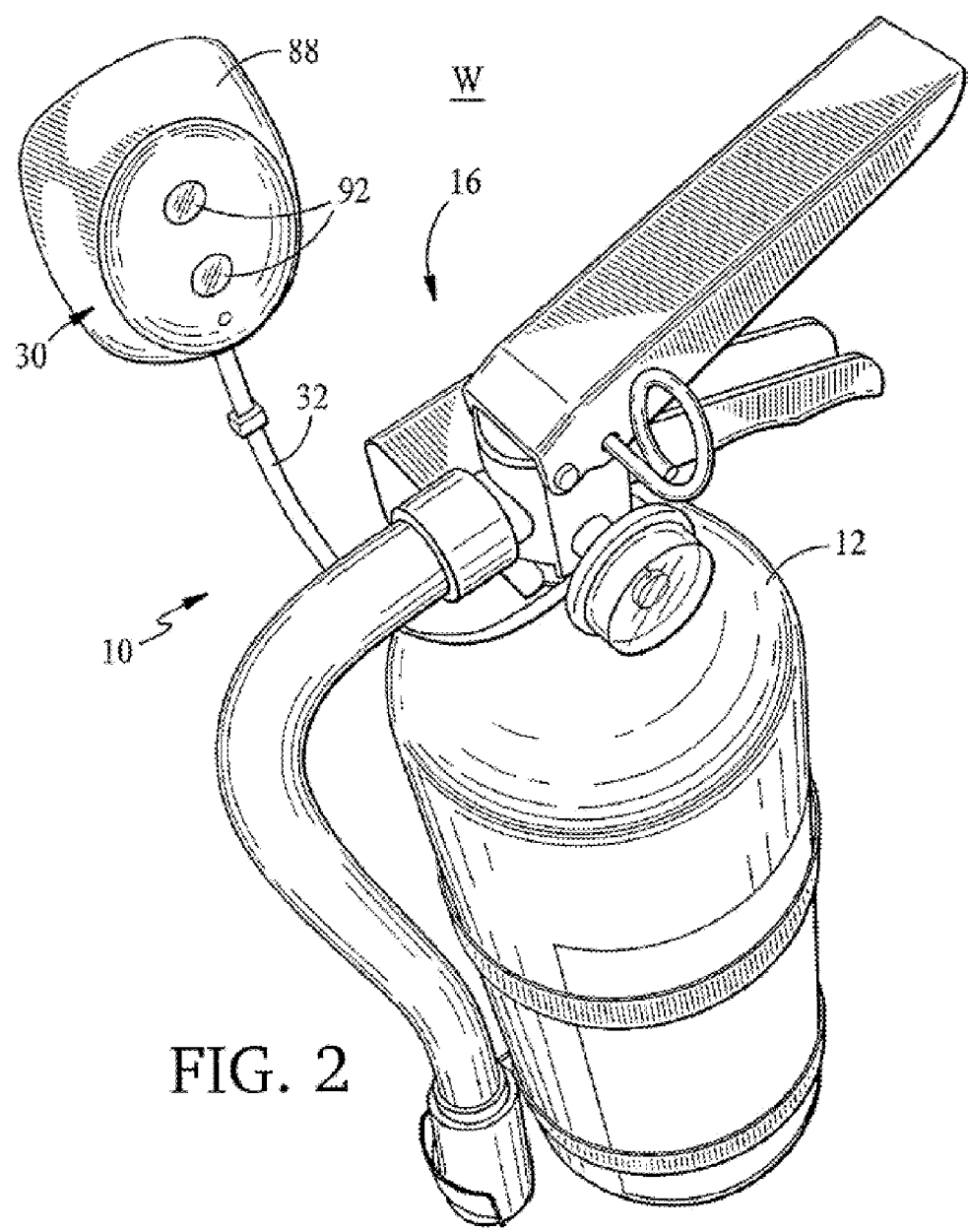
FIG. 2 is a perspective view of a fire extinguisher mounted at a fire extinguisher station for remote inspection.

As an example of a remote inspection apparatus 10, in FIG. 2, a portable fire extinguisher 12 is shown mounted to a wall, post, or other support surface, W, at a fire extinguisher station 16 in a system of fire extinguisher stations 14, as described for example in U.S. patent application Ser. No. 10/274,606, filed Oct. 21, 2002, now pending, which is a continuation-in-part of U.S. application Ser. No. 09/832,531, filed Apr. 11, 2001, now U.S. Pat. No. 6,585,055, which is a continuation-in-part of U.S. application Ser. No. 09/212,121, filed Dec. 15, 1998, now U.S. Pat. No. 6,302,218, issued Oct. 16, 2001, which is a continuation of U.S. application Ser. No. 08/879,445, filed Jun. 20, 1997, now U.S. Pat. No. 5,848,651, issued Dec. 15, 1998, which is a continuation-in-part of U.S. application Ser. No. 08/590,411, filed Jan. 23, 1996, now U.S. Pat. No. 5,775,430, issued Jul. 7, 1998, and a continuation-in-part of International Application No. PCT/US97/01025, with an International Filing Date of Jan. 23, 1997, now abandoned, the complete disclosures of all of which are incorporated herein by reference. Additionally, portions of the apparatus 10 are described in U.S. patent application Ser. No. 08/638,343, filed Apr. 26, 1996, now U.S. Pat. No. 5,834,651, issued Nov. 10, 1998, which is a divisional of U.S. application Ser. No. 08/403,672, filed Mar. 14, 1995, now abandoned, the complete disclosures of all of which are incorporated herein by reference. Additionally, portions of the apparatus 10 are described in U.S. patent application Ser. No. 10/024,431, filed Dec. 18, 2001, now pending, which claims priority of U.S. Provisional Application No. 60/256,372, filed Dec. 18, 2000, now expired, the complete disclosures of all of which are incorporated herein by reference. Additionally, portions of the apparatus 10 are described in U.S. patent application Ser. No. 09/988,852, filed Nov. 19, 2001, now U.S. Pat. No. 6,488,099, issued Dec. 3, 2002, which is a divisional of the U.S. application Ser. No. 09/832,531, filed Apr. 11, 2001, now U.S. Pat. No. 6,585,055, issued Jul. 1, 2003, the complete disclosures of all of which are incorporated herein by reference. Additionally, portions of the apparatus 10 are described in International Application No. PCT/US02/11401, with an International Filing Date of Apr. 4, 2002, now pending, which claims priority of the U.S. application Ser. No. 09/832,531, filed Apr. 11, 2001, now U.S. Pat. No. 6,585,055, the complete disclosures of all of which are incorporated herein by reference. Additionally, portions of the apparatus 10 are described in U.S. patent application Ser. No. 09/742,733, filed Dec. 20, 2000, now U.S. Pat. No. 6,311,779, issued Nov. 6, 2001, the complete disclosure of which is incorporated herein by reference.

As shown in FIG. 2, the portable fire extinguisher 12 may include a fire extinguisher tank 34 containing a fire extinguishing material, e.g., water, dry chemical or gas, and a fire extinguisher valve assembly 36 (e.g. as available from MIJA Industries Inc., of Rockland, Mass.) mounted to releasably secure an opening in the tank. The valve assembly 36 further may include a gauge 50 (e.g., a Bourdon coiled tubing gauge of the type also available from MIJA Industries Inc.) to provide an indication of the pressure status of fire extinguishing material within the fire extinguisher tank 34. A Hall effect sensor, Reed switch, or the like may be included in the gauge 50 and adapted to provide a signal as the extinguisher tank 34 contents approach a low pressure limit or a high pressure limit, as described in U.S. patent application Ser. No. 10/274,606, filed Oct. 21, 2002. It will further be appreciated that any suitable sensing means may be employed, any of which may detect limits as well as a range of intermediate states such as a continuous range of detection between low or empty and high or full that might be analyzed to evaluate operation relative to such limits. This may include sensors for pressure, as well as sensors for any suitable proxy for pressure such as external or internal stresses (with, e.g., a strain gauge) or weight/mass.

The fire extinguisher 12 at each fire extinguisher station 16 may be releasably connected to a docking station 30 by an electronics and communications tether 32 that transfers signals between the fire extinguisher 12 and the docking station 30 along with initiating a signal sent by the docketing station to the remote central station 26 (shown in FIG. 1) based on movement of the extinguisher as also described in U.S. patent application Ser. No. 10/274,606, filed Oct. 21, 2002. Signals initiated from the gauge 50 and through the tether 32, to the docking station 30 and remote central station 26 (shown in FIG. 1), may provide an indication of out-of-range (low or high) pressure in the tank 34.

The length of the tether 32, and the tenacity of engagement of the tether between the docking station 30 and the fire extinguisher 12 may be selected so that any significant movement of the fire extinguisher 12 relative to its installed position, i.e., the position in which it is placed at installation by a fire extinguisher professional, whether removal, rotation, or any other physical displacement in excess of a predetermined threshold value, will result the tether releasing from the fire extinguisher 12, thus break communication between the gauge 50 and the docking station 30, and initiating a signal to the remote central station 26 (shown in FIG. 1). It will be understood that while the tether 32 may be a physical tether, any form of virtual tether may also or instead be employed using, e.g., proximity detection, location awareness, geofencing, beam breaking, and/or any other suitable techniques. For example, the tether may include gyroscopic or inertial sensors on the fire extinguisher, along with processing to control and analyze feedback from these sensors to detect physical displacement of the fire extinguisher 12 from its installed position. As another example, the fire extinguisher 12 may include an RFID tag, with a tag reader on a corresponding docking station (or otherwise nearby to the fire extinguisher 12) that periodically or continuously confirms presence of the fire extinguisher 12 scanning the RFID tag. Any of the foregoing, or any other suitable techniques, may be used as a virtual tether between the fire extinguisher 12 (or any component of the fire extinguisher 12, such as the gauge 50) and the docking station 30 that operates to notify the remote central station 26 when the fire extinguisher is deployed, or otherwise removed from an installed position.

In the implementation shown in FIG. 2, the docking station 30 is fixedly mounted to the wall, W, at a predetermined position. The docking station 30 may include a housing 88 containing a sonar module (not shown) and spaced apertures or windows 92 through which the module emits and receives ultrasonic signals. Also, disposed within the docking station housing 88 may be an electronic and communications circuit (not shown) that transmits and receives signals to and/or from the connected fire extinguisher 12 and the remote central station 26 (shown in FIG. 1), as described more fully in U.S. application Ser. No. 10/274,606, filed Oct. 21, 2002.

Referring to FIG. 1, the circuitry contained in docking station housing 88 (shown in FIG. 2) may issue a signal 100 or a signal 102 upon detection of a predetermined external condition, e.g., lack of presence of the fire extinguisher 12 at its installed position at the fire extinguisher station 16, when the fire extinguisher 12 is removed from, or moved within the respective station, thereby disengaging the tether 32 (shown in FIG. 2) from its connection to the respective fire extinguisher 12, and disrupting the closed connection (signal 100), or an obstruction to viewing of or access to a fire extinguisher station 16 (signal 102). The docking station housing 88 circuitry may also issue a signal 104 upon detection of a predetermined internal condition, e.g., existence of an out-of-range, e.g., low, pressure condition of the fire extinguishing material contained within the fire extinguisher tank 34 (shown in FIG. 2). It will be understood that internal and external conditions as used herein may generally include intrinsic or extrinsic properties of the tank 34 (or other fluid container). Thus for example, an intrinsic property such as weight or location may generally be an internal condition as that term is used herein, and an extrinsic property such as ambient temperature may be an external property as that term is used herein. More generally, any reference to a condition herein should be understood to include any condition, property, state or other characteristic of a fluid container or the container's environment. Thus the detailed embodiments described herein are provided by way of example and not of limitation.

According to one implementation, the signals 100, 104 are communicated between the fire extinguisher 12 and the electronics and communications circuitry within docking station 30 through the connected tether 32. The signal 100 indicating lack of presence of the fire extinguisher 12 in its installed position at the fire extinguisher station 16 and signal 104 indicating that pressure of the fire extinguishing material in the fire extinguisher tank 34 is below the predetermined minimum pressure level, e.g., indicative of a discharge, leak or other malfunction (or, in an implementation with a pair of Hall Effect sensors or Reed switches, above a predetermined maximum pressure level) may be received by circuitry within the docking station 30 and transmitted via hardwire connection 118 to the remote central station 26. However, it is contemplated that, in other implementations, signals 100, 102, 104 may be communicated, e.g., via RF (or other) wireless communication circuitry via antennae 120 (FIG. 1) to an RF monitoring system receiver, e.g., at the remote central station 26, or simultaneously or consecutively, via both hardwire and wireless, to a remote central station 26, or other monitoring station. Also, in some implementations wireless communication circuitry and antenna 120 (FIG. 1) are located within the housing 88 to communicate by wireless signal between the fire extinguisher 12 and the previously mentioned RF monitoring system receiver, e.g., at the remote central station 26. Signals 100, 102 may be communicated by wireless signal between the remote central station 26 (FIG. 1) and the fire extinguisher station 16 upon detecting the previously mentioned predetermined external conditions. Signals, such as the signal 104, may also be communicated by wireless signal upon detection of any of the previously mentioned predetermined conditions. In this manner, a system of fire extinguishers, distributed over a considerable area, may be maintained in wireless communication with the remote central station 26.

Figure 3:
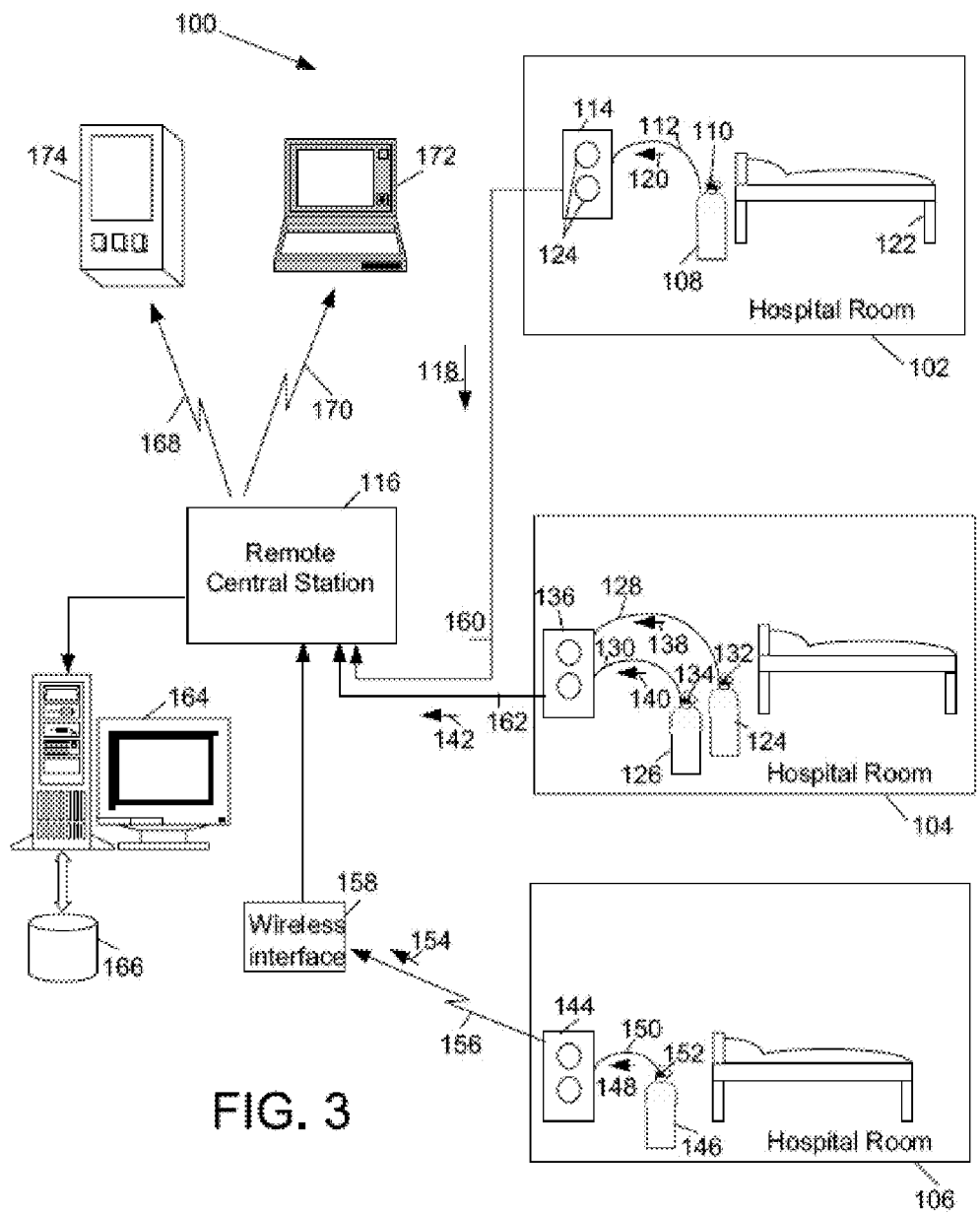
FIG. 3 is a somewhat diagrammatic view of an apparatus of the invention for remote inspection of oxygen tanks at a healthcare facility.

Referring to FIG. 3, in another implementation, an apparatus 100 for remote inspection of portable tanks includes means for monitoring the contents of oxygen tanks distributed throughout locations (e.g., rooms) associated with a healthcare facility such as a hospital, assisted living facility, or a nursing home. The apparatus 100 may also or instead include means for monitoring the contents of oxygen tanks, or other similar portable tanks, distributed throughout one or more residential homes for assisting in healthcare, or any other facility where fluid tanks might be usefully deployed. For example, one or more oxygen tanks may be located throughout a facility for treatment of the current occupants of a healthcare facility. In the example shown in FIG. 3, oxygen tanks are located in three hospital rooms 102, 104, 106. In hospital room 102, an oxygen tank 108 includes a gauge 110 for monitoring the contents of the oxygen tank, such as by measuring and displaying the pressure of contained oxygen. Similar to the gauge 50 used with the fire extinguisher 12 shown in FIG. 2, the gauge 110 may be in communication with an electronic tether 112 connected to a docking station 114 that includes circuitry for transmitting a signal 118 to a remote central station 116 based on a signal 120 received from the electronic tether. The signal 118 received at the remote central station 116 may communicate to hospital personnel information on the internal conditions of the oxygen tank 108 as measured by the gauge 110. For example, an alert may be issued if the internal pressure of the oxygen tank 108 falls below a predetermined threshold so that replacement of the tank or replenishment of the oxygen can be scheduled. Also similar to the apparatus 10 shown in FIG. 1, the signal 118 may also include information representing one or more external conditions (e.g., removal of the oxygen tank, obstructed access to the oxygen tank, etc.) associated with the oxygen tank 108. For example, a sonar module, enclosed in the docking station 114, similar to the sonar module described in conjunction with FIG. 2, may transmit and receive ultrasonic signals through apertures 124 to detect objects obstructing access to the oxygen tank 108, such as a bed 122.

In some embodiments, multiple oxygen tanks, or a combination of two or more tanks containing different fluids may be present in a hospital room, as shown in hospital room 104. In this arrangement, oxygen tanks 124, 126 are attached to respective gauges 132, 134 connected by respective electronic tethers 128, 130 to communicate signals from the respective gauges. Circuitry included in a docking station 136 connects to each electronic tether 128, 130 and combines (e.g., multiplexes) signals 138, 140, received from the respective oxygen tanks 124, 126, which may include information associated with the internal conditions of each tank. Additionally, the circuitry in the docking station 136 may combine information associated with external conditions (e.g., obstruction detected by a sonar module included in docking station 136) of the tanks 126, 124 with the information from the respective gauges 132, 134. Once the information is combined, a signal 142 may be transmitted from the docking station 136 to the remote central station 116. The circuitry included in the docking station 136, or included in each gauge 132, 134, may also encode tank identification information in the signal 142, thereby permitting the remote central station 116 to differentiate between the two tanks as to the source of the transmitted signal 142.

In other embodiments, wireless signal transmission and reception circuitry (e.g., an RF circuit, antenna, etc.) may be incorporated into a docking station 144 for transmission of wireless signals between a hospital room and the remote central station 116. As shown in a hospital room 106, a wireless signal 154 containing information associated with conditions of an oxygen tank 146 may be transmitted from the hospital room over a wireless link 156. In the hospital room 106, a docking station 144 may receive a signal 148 from an electronic tether 150 connected to a gauge 152 attached to the oxygen tank 146. Wireless signal transmission circuitry in the docking station 144 may transmit the signal 154 over the wireless link 156 to a wireless interface 158 that receives the wireless signal and communicates the information contained in the signal to the remote central station 116. As with the other hospital rooms 102 and 104, information received by the remote central station 116 may include information associated with internal conditions (e.g., internal pressure) and external conditions (e.g., obstruction) of the oxygen tank 146, or any other properties, conditions, or status of the oxygen tank 146, to alert hospital personnel to the condition and provide information collected from the other oxygen tanks 108, 124, 126 in each of the other hospital rooms 102, 104.

Each docking station 114, 136, 144 may be connected by a hardwire connection 160, 162 or a wireless link 156 so that information associated with each oxygen tank is received by the remote central station 116. The hardwire connections 160, 162 may be included in a communication network (e.g., a local area network, LAN, or a wide area network, WAN, etc.) to transmit the respective signals 118, 142 to the remote central station 116. The wireless interface 158 may receive the signal 154 over a wireless link 156 and use additional wireless links (e.g., cellular links, satellite links, etc.) to transfer the internal and external conditions of the oxygen tank 146 to the remote central station 116. A combination of wireless links and hardwire connections may also or instead be used to transmit the signals from oxygen tanks 108, 124, 126, 146 to the remote central station 116.

After the signals are received at the remote central station 116 from the hospital rooms 102, 104, 106, the information included in the received signals may sorted, analyzed and displayed by a computer system 164 to alert hospital personnel as to the conditions associated with each oxygen tank 108, 124, 126, 146. The computer system 164 also stores the received and sorted information on a storage device 166 (e.g., a hard drive, CD-ROM, etc.) for retrieval at a future time for further processing and reporting. The remote central station 116 may include wireless transmission and reception circuitry for transmitting and receiving wireless signals. For example, wireless circuitry (e.g., RF circuitry, antenna, etc.) included in the remote central station 116 can be used to transmit information over wireless links 168, 170 to wireless devices such as a laptop computer 172, a personal digital assistant (PDA) 174, or other similar wireless device (e.g., a cellular phone). Transmission of the information to wireless devices may provide hospital personnel not located at the remote central station 116 with information on the condition of the oxygen tanks 108, 124, 126, 146 and an alert to any problems (e.g., tank pressure in hospital room 102 as fallen below a predetermined threshold) associated with one or more of the oxygen tanks By providing wireless access to the information collected at the remote central station 116, the response time of hospital personnel to one or more of hospital rooms can be reduced.

Figure 4:
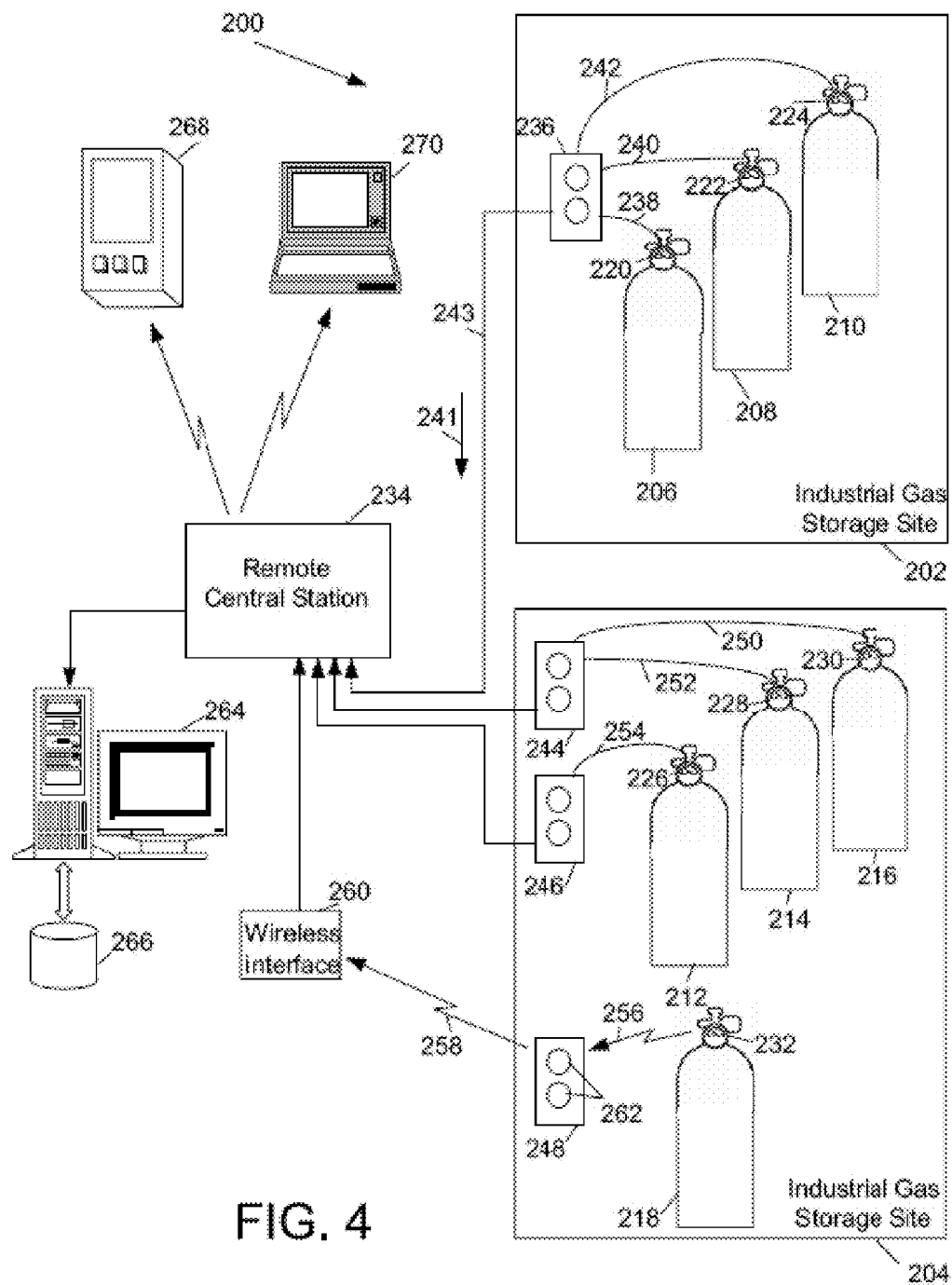
FIG. 4 is a somewhat diagrammatic view of an apparatus for remote inspection of industrial tanks at an industrial tank storage facility.

Referring to FIG. 4, in another embodiment, an apparatus 200 for remote inspection of portable tanks includes means for monitoring contents of industrial gas tanks 206, 208, 210, 212, 214, 216, 218 stored at industrial gas storage sites 202, 204. Contents of each industrial tank 206, 208, 210, 212, 214, 216, 218 are monitored with respective gauges 220, 222, 224, 226, 228, 230, 232 such that each is capable of initiating a signal to a remote central station 234 to alert storage site personnel to conditions (e.g., an internal condition such as internal pressure) associated with each industrial tank. In the industrial gas storage site 202, three respective gas tanks 206, 208, 210 may be stored in communication with a docking station 236 by respective electronic tethers 238, 240, 242 respectively connected to gauges 220, 222, 224 for monitoring the industrial gases in each respective tank. In this particular arrangement, docking station 236 is connected to all three electronic tethers 238, 240, 242, and may include circuitry for combining (e.g., multiplexing) signals from each of the three industrial gas tanks 206, 208, 210 into a single signal 241 that is transmitted over a hardwire 243 to a remote central station 234. Similar to the docking station 114 shown in FIG. 3, external conditions associated with the industrial gas tanks 206, 208, 210 may be monitored from the docking station and a signal may be initiated by a sonar module or the like included in the docking station 236 when an obstruction is detected. Similar to the docking station 30 shown in FIG. 2, a signal may be initiated from circuitry included in the docking station 236 when the electrical connection between the docking station and any of the electronic tethers 238, 240, 242 are broken.

The industrial gas storage site 204 may include three docking stations 244, 246, 248 (or any greater or lesser number) that respectively receive signals from the respective gauges 226, 228, 230, 232 monitoring the contents of the respective industrial gas tanks 212, 214, 216, 218. In this particular example, a docking station 244 connects to two gas tanks 214, 216 via respective electronic tethers 250, 252 while another docking station 246 is dedicated to receiving signals from gas tank 212 through electronic tether 254. Similarly, a third docking station 248 at the storage site 204 may be dedicated to an industrial gas tank 218. However, a gauge 232 monitoring the contents of the industrial gas tank 218 and the associated docking station 248 monitoring the gas tank external conditions may each include wireless transmission and reception circuitry to provide a wireless communication link 256 for transmitting conditions or properties (such as internal conditions) of the tank 218 from the gauge 232 to the docking station 248. Similar to the tether 32 (shown in FIG. 2) releasing from the docking station 30 (also shown in FIG. 2), the wireless link 256 may also initiate a signal from the docking station 248 if the link is interrupted due to moving of the gas tank 218 from close proximity to the docking station 30. The wireless transmission and reception circuitry in the docking station 248 may also form a wireless link 258 with a wireless interface 260, so that information encoded in a wireless signal received by the docking station 248 from the gauge 232 is transmitted to the wireless interface, which may transfer the information to the remote central station 234. The docking station 248 may also use the wireless link 258 for transmitting information associated with external conditions (e.g., obstruction) of the tank 218, as provided by apertures 262 and a sonar module included in the docking station similar to the previous docking stations described in conjunction with FIGS. 1-3. More generally, the docking station 248 may receive and transmit information associated with any condition or property of the tank 218.

Similar to the apparatus 100 shown in FIG. 3, the remote central station 234 may receive information from each docking station 236, 244, 246, 248 and transfer the information to a computer system 264 for processing (e.g., sorting, analysis, alert generation, report creation, storage, and so forth) and displaying. In this example, storage site personnel are provided with information on internal conditions (e.g., internal tank pressure) and external conditions (e.g., tank obstruction) associated with each tank 206, 208, 210, 216, 214, 216, 218 and alerted to any potential emergencies. The computer system 264 may also store information on a storage device 266 for retrieval at a future time e.g., for further analysis or creation of reports. Also similar to the apparatus 100 (shown in FIG. 3), the remote central station 234 may include wireless transmission and reception circuitry (e.g., RF circuits, antenna, etc.) for wireless transmission and reception of information to a personal digital assistant 268, a laptop computer 270, or any other wireless devices (e.g., a cellular phone) so that storage site personnel (or other interested parties) not located at the remote central station 234 can be informed of the internal and external conditions of each tank 206, 208, 210, 216, 214, 216, 218 stored at each respective storage site 202, 204. By transmitting conditions related to each tank to storage site personnel, response times for out-of-standard conditions present at one or both sites 202, 204 (e.g., internal pressure rising to dangerous level in the tank 206, an unscheduled re-locating of the tank 212, etc) may be reduced.

Figure 5:
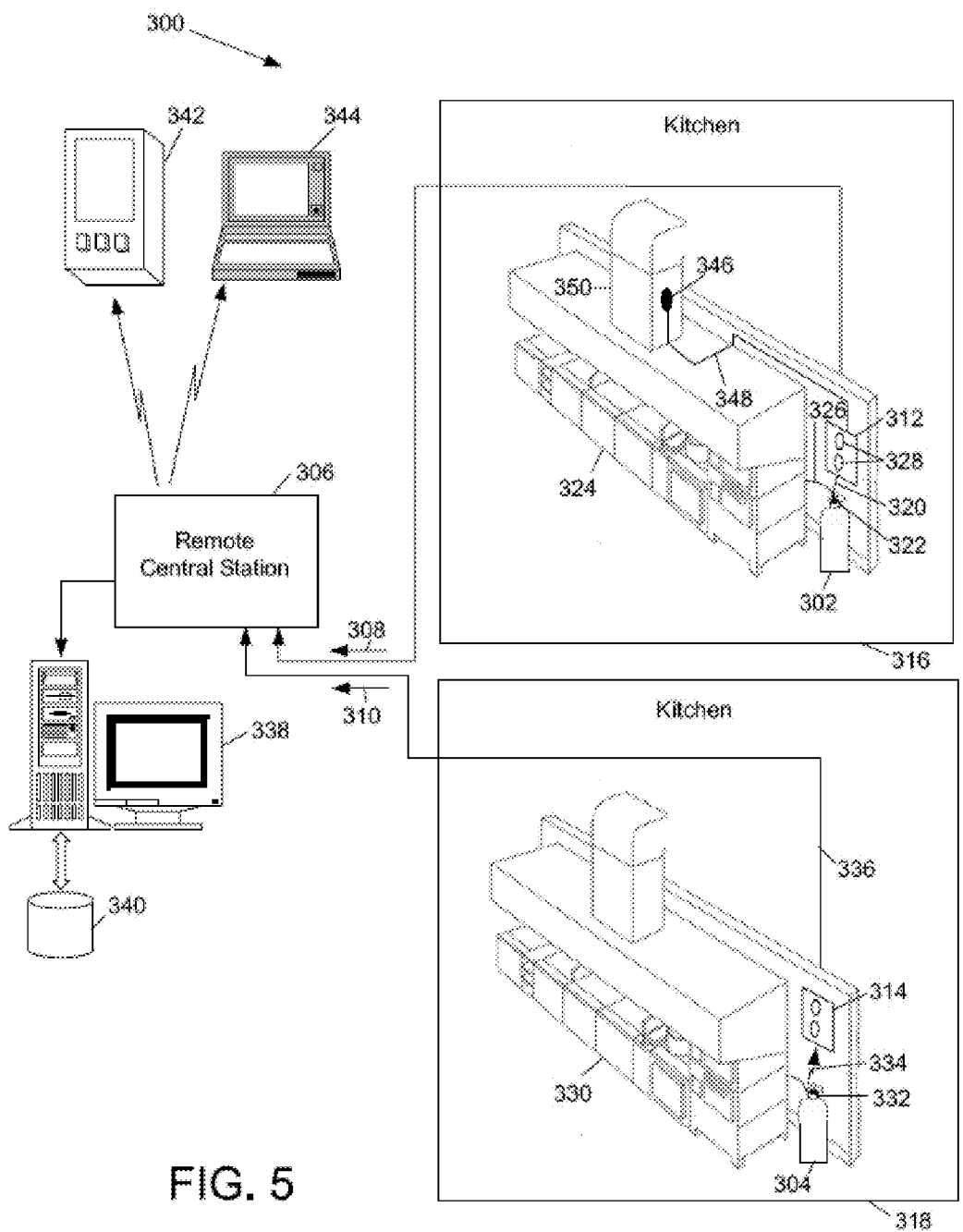
FIG. 5 is a somewhat diagrammatic view of an apparatus for remote inspection of commercial gas tanks at a commercial facility.

Referring to FIG. 5, in another implementation, an apparatus 300 for remote inspection of portable tanks includes means for monitoring contents of gas tanks 302, 304 used in commercial facilities. In this particular embodiment a remote central station 306 may receive signals 308, 310 from two respective wall-mounted docking stations 312, 314 located in two respective commercial kitchens 316, 318. In kitchen 316 the wall-mounted docking station 312 may receive signals through an electronic tether 320 from a gauge 322 monitoring the internal conditions of the tank 302 supplying gas to kitchen equipment 324 through a connected gas hose 326. Similar to the docking stations shown in FIGS. 2-4, a sonar module in the docking station 312 may detect access obstructions to the tank 302 through apertures 328. By monitoring the internal and external conditions associated with tank 302, personnel located at the remote central station 306 can detect when the contents of the tank are nearly exhausted and schedule tank replacement or contents replenishment.

Similar monitoring may be performed in a kitchen 318 for a tank 304 providing gas to kitchen equipment 330. However, in this particular embodiment, a gauge 332 and a docking station 314 each includes wireless transmission and reception circuitry (e.g., RF circuit, antenna, etc) such that the gauge transmits one or more signals encoded with information relating to the internal conditions of the tank 304 over a wireless link 334 to the docking station. Upon receiving the one or more signals from the gauge 332, the docking station 314 may transmit the signal 310 over a hardwire 336 to the remote central station 306. However, in some embodiments the wireless transmission and reception circuitry included in the docking station 314 and the remote central station 306 allows the signal 310 to be transmitted over a wireless link.

Similar to the apparatus shown in FIG. 3, the remote central station 306 may include a computer system 338 that collects and stores, on a storage device 340, information transmitted to the remote central station and processes (e.g., sorts, analyzes, and so forth) the received information such that the remote central station can alert personnel to conditions such as internal conditions (e.g., internal pressure) and external conditions (e.g., access obstructed) associated with each tank 302, 304. Once alerted, the personnel can take appropriate steps based on the internal (e.g., reduce internal pressure in the tank 302) and/or external (e.g., remove obstructions near the tank 304) conditions detected. Similar to the apparatus 100 shown in FIG. 3, the remote central station 306 may include wireless transmission and reception circuitry (e.g., RF circuits, antenna, etc) for transmitting wireless signals to a PDA 342 and a laptop computer 344, or other wireless devices (e.g., a cellular phone) so that personnel can quickly be alerted to the internal pressure of the tanks 302, 304, obstructions of the tanks, or other internal and external conditions by using these wireless devices.

In some embodiments a flow gauge 346 monitors exhaust gases that propagate through a hood 350 of the kitchen equipment 324 of the kitchen 316. A hardwire cable 348 carries one or more signals from the flow gauge 346 to the docking station 312 that may send one or more signals to the remote central station 306 for processing (e.g., sorting) and display of information associated with the exhaust gases (e.g., exhaust flow rate, exhaust volume, etc). Hardwire cable 348 may be replaced or supplemented by a wireless link by including wireless transmission and reception circuitry (e.g., RF circuit, antenna, etc.) with the flow gauge 346 such that one or more wireless signals are sent to wireless transmission and reception circuitry in the docking station 312. Similar to the information processed from the tanks 302, 304, information from the flow gauge 346 can be sent from the docking station 312 to the remote central station 306 and then transmitted to wireless devices (e.g., PDA 342, laptop computer 344, etc.) so that personnel can be quickly alerted to abnormal gas exhaust conditions.

In the particular embodiment shown in FIG. 5, the gauges 322, 332 and the docking stations 312, 314 monitor internal and external conditions of the respective tanks 302, 304 and the flow gauge 346 monitors exhaust gases that flow through the hood 350. However, in some embodiments one or more gauges, docking stations, and/or flow gauges can be used individually or in combination to monitor internal and external conditions of a chemical hood and portable chemical tanks that are used in conjunction with the chemical hood. Chemical hoods are often implemented for venting harmful gases used in fabrication processes, manufacturing processes, and other processes that use one or more chemicals stored in portable tanks. By monitoring internal conditions (e.g., internal pressure) of the portable chemical tanks used with the chemical hoods, information collected can be used to alert personnel when the internal pressure of a particular chemical tank is low and the tank should be scheduled for replacement. Also, a sonar module in a docking station associated with monitoring of a portable chemical tank can detect if an object is obstructing access to the tank and to quickly alert personnel to this potentially dangerous situation. A flow gauge mounted onto the chemical hood, similar to the flow gauge 346 mounted to the hood 350 (shown in FIG. 5), additionally allows monitoring of e.g., the flow rate, volume, and other properties of the exhaust gases. Information collected by the flow gauge and transmitted to a remote central station, can also be stored for future analysis such as for evaluating flow changes over time that may have been caused e.g., by an obstruction in the chemical hood or some other flow reduction source like a malfunctioning exhaust fan.

A non-contact ultrasonic sensor (sonar module) may be employed for detecting the presence of an obstruction. Alternatively, a non-contact optical sensor may be employed. Both have sensitivity over wide ranges of distances (e.g., about 6 inches to about 10 feet, or other ranges as may be dictated, e.g., by environmental conditions). As an obstruction may move slowly, or may be relatively stationary, it may not be necessary to have the sensor active at all times; periodic sampling, e.g., once per hour, may be sufficient. On the other hand, the sonar module in the docking station 312 may also be utilized as a proximity or motion sensor, e.g., in a security system, e.g., to issue a signal to the remote central station 306 and/or to sound an alarm when movement is detected in the vicinity of the portable tank 302 while kitchen 316 is not operating, e.g., after business hours or during weekends or vacations. In this case, continuous operation may be dictated, at least during periods when the security system is active. Other features and characteristics may be optimally employed, as desired, including: wide angle and narrow angle sensitivity, digital output ("Is there an obstruction or not?"), and/or analog output (e.g., "How large an obstruction?" and "How far away from the docking station?").

The gauge 322 may optionally include an electro luminescent light panel that generates a visual signal to passersby, warning of the low-pressure condition of the portable tank 302. In some embodiments, the gauge 322 may include an electronic circuit that causes intermittent illumination of the light panel, thereby to better attract the attention of passersby.

Additionally, the gauge 322 may include an electronic circuit and an audio signaling device for emitting, e.g., a beeping sound, instead of or in addition to the visual signal. The audio signal device may be triggered when internal pressure of the portable tank 302 drops to or below a predetermined level. The audio signal may consist of a recorded information message, e.g., instructions to replace the tank or to replenish the tank contents. The gauge 322 may also include a light sensor, e.g., of ambient light conditions, to actuate illumination of the light panel in low or no light conditions, e.g., to signal the location of the portable tank 302, at night or upon loss of power to external lighting. The gauge 322 may also include a sensor adapted to sense other local conditions, e.g., smoke or fire, to actuate illumination of the light panel and/or audio signal device when smoke or other indications of a fire are sensed, e.g., to signal the location of the tank, when visibility is low.

The gauge 322 may include electronic circuitry to encode an identification specific to the associated tank 302 for receiving and dispatching signals or messages, e.g., of the internal condition of the tank, via the electronics and communications circuitry included in the docking station 312, and/or an internal antenna, identifiable as relating to that tank, to the remote central station 306 and/or to other locations. The docking station 312 may contain a circuit board programmed with the protocols for certain alarms or signals relating to predetermined internal and external conditions, and may include a battery for primary or auxiliary power.

In other embodiments, two or more sonar modules may be employed to provide additional beam coverage. Also, various technologies may be implemented to communicate by wireless signal among the gauge 320 and/or the docking station 312 and/or the remote central station 306. Radio frequency (RF) signaling, infrared (IR) signaling, optical signaling, or other similar technologies may be employed to provide communication links. RF signaling, IR signaling, optical signaling, or other similar signaling technologies may also be implemented individually or in any suitable combination for communicating by wireless signal among the gauge 322, the docking station 312, and the remote central station 306.

In other embodiments, wireless signaling technology may incorporate communication technologies (e.g., Bluetooth) to provide point-to-point or multi-point communication connections among the tanks 302, 304 and/or the docking stations 312, 314 and/or the remote central station 306. These technologies may include, for example, local wireless technology, wide area wireless technology, cellular technology, infrared technology, and/or satellite technology. The wireless signaling technology may further incorporate spread spectrum techniques (e.g., frequency hopping) to allow the extinguishers to communicate in areas containing electromagnetic interference. The wireless signaling may also incorporate identification encoding along with encryption/decryption techniques and verification techniques to provide secure data transfers among the devices.

In other embodiments, a Global Positioning System (GPS) may be located on the tank 302 and/or the gauge 322 and/or the docking station 312 and/or the remote central station 306. The GPS may determine, for example, the geographic location of each respective tank and provide location coordinates, via the wireless signaling technology, to the other tanks and/or the remote central stations. Thus, the GPS system may provide the location of the tanks and allow, for example, movement tracking of the tanks.

In still other embodiments, various sensing techniques, besides the sonar modules, may sense objects obstructing access to the tank 302. Similar to sonar, obstructing objects may be detected by passive or active acoustic sensors. In other examples, obstructions may be sensed with electromagnetic sensing techniques (e.g., radar, magnetic field sensors), infrared (IR) sensing techniques (e.g., heat sensors, IR sensors), visual sensing techniques (e.g., photo-electric sensors), and/or laser sensing techniques (e.g., LIDAR sensors). These technologies may, for example, be utilized individually or in concert to sense obstructions that block access to the tank 302.

Also, the signaling may use networking techniques to provide one-directional and/or multi-directional communications among the devices. In one example, signals may be networked asynchronously, such as in an asynchronous transfer mode (ATM). The signals may also be networked synchronously, such as, for example, in a synchronous optical network (SONET). In still another example, the signals may be transmitted over a landline in an integrated services digital network (ISDN), as well as over other similar media, for example, in a broadband ISDN (BISDN).

A remote inspection apparatus may also be employed for remote inspection of multiple portable tanks at one or a system of locations. Communication, including wireless communication, or inspection or other information, between the portable tank and the central station, may be carried on directly, or indirectly, e.g. via signal or relay devices, including at the docking station in communication with the gauge attached to the portable tank.

Figure 6:
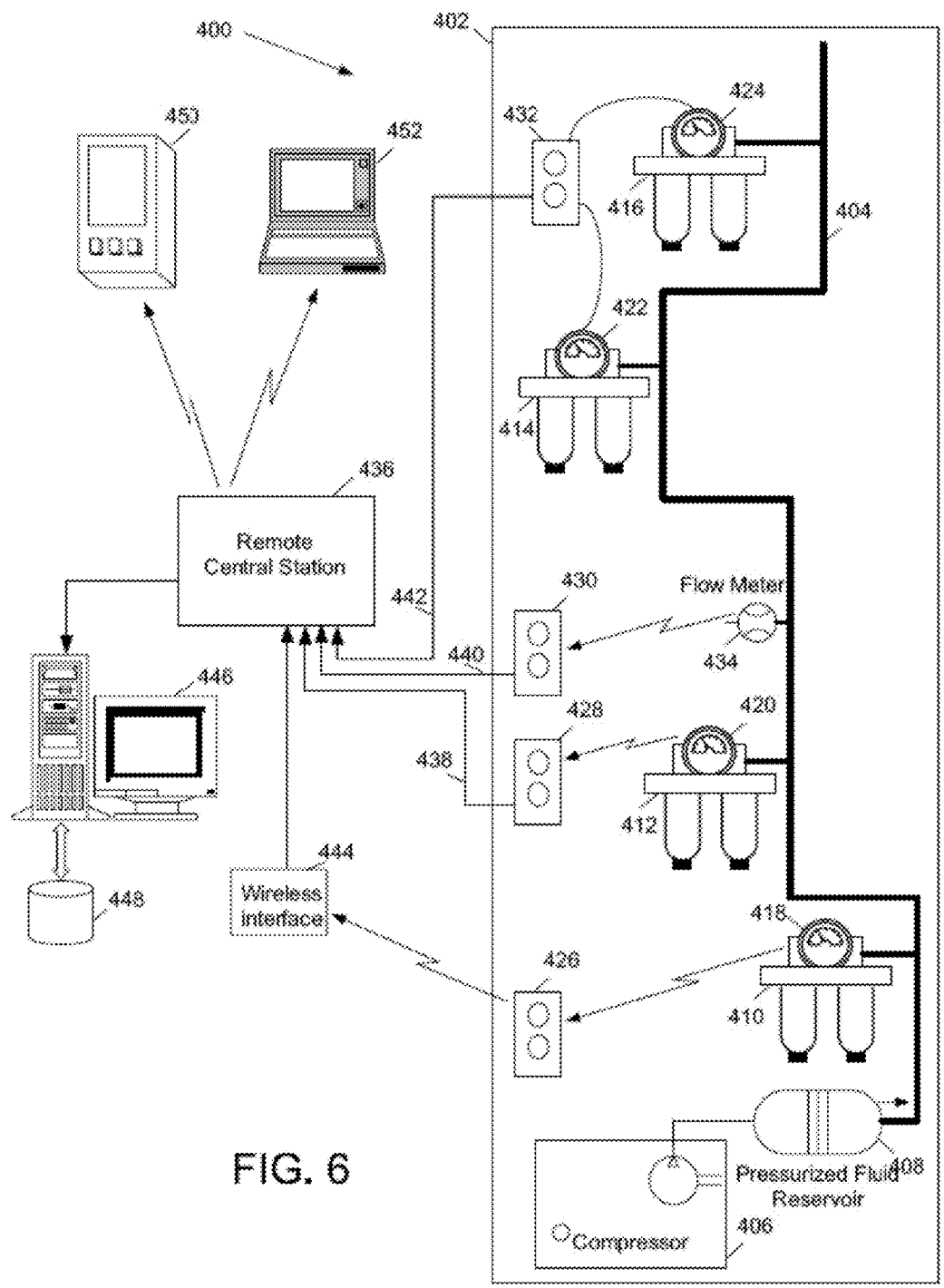
FIG. 6 is a somewhat diagrammatic view of an apparatus for remote inspection of a pipeline in a manufacturing facility.

Referring to FIG. 6, in another implementation, an apparatus 400 provides for remote inspection of fluid flow in a manufacturing plant 402 or other similar facility. In this particular embodiment a fluid such as hydraulic fluid, air, water, oxygen, fuel oil, etc. flows through a pipeline 404 that extends throughout the manufacturing plant 402 for use in manufacturing or other commercial or private enterprises. However, in other embodiments, for example in conjunction with FIG. 3, the pipeline 404 may be extended into one or more of the hospital rooms 102, 104, 106 to provide an oxygen source and replace the need for the respective oxygen tanks 110, 124, 126, 146. Returning to FIG. 6, a compressor 406 is connected to a fluid reservoir 408 for pressurizing contained fluid and the pipeline 404 serves as a means to deliver the pressurized fluid to one or more sites within the manufacturing plant 402. As the pipeline 404 extends throughout the manufacturing plant 402 a number of filter units 410, 412, 414, 416 may be connected to the pipeline for filtering the pressurized fluid and monitoring the pressure of the fluid carried by the pipeline. Each of the filter units 410, 412, 414, 416 includes a pair of filters and a respective gauge 418, 420, 422, 424 that is similar to the gauges 110, 132, 134, 152 shown in FIG. 3. Also similar to FIG. 3, each of the gauges 418, 420, 422, 424 may be in communication with a respective wall-mounted docking station 426, 428, 430, 432 by either an electronic tether or a wireless link. Each of the wall-mounted docking stations 426, 428, 430, 432 may receive signals initiated from the respective gauge 418, 420, 422, 424 that contains information such as the pipeline pressure detected by the gauge.

Also, in this particular embodiment a flow meter 434 is connected to the pipeline 404 to measure the flow of fluid through a particular portion of the pipeline. Similar to the gauges 418, 420 included in the filter units 410, 412, the flow meter 434 includes wireless signal transmission and reception circuitry (e.g., an RF circuit, antenna, etc.) to form a wireless link with the docking station 430. Also in some embodiments, similar to the docking stations 114, 136, 144 shown in FIG. 3, circuitry included in the docking stations may combine the information provided by the respective gauges with external conditions (e.g., an obstruction detected by a sonar module included in the docking stations) monitored at the docking stations. Once combined, signals may be transmitted from the docking stations 426, 428, 430, 432 to a remote central station 436. In some embodiments, each docking station 426, 428, 430, 432, gauge 418, 420, 422, 424, or flow meter 434 individually or in combination includes circuitry that encodes identification information in the respective signal to permit the remote central station 436 to differentiate among the filter units 418, 420, 422, 424 or the flow meter 434 as the source of the transmitted signal. Similar to the docking station 136 shown in FIG. 3, the docking station 432 may include circuitry and connections for permitting two of the gauges 422, 424 to each connect to the docking station and for combining (e.g., multiplexing) signals initiated from each of the two gauges prior to transmitting a signal to the remote central station 436. Respective hardwires 438, 440, 442 may also or instead be used for transmitting respective signals initiated at the docking stations 428, 430, 432 to the central remote station 436. The docking station 426 may also or instead include wireless signal transmission and reception circuitry (e.g., an RF circuit, antenna, etc.) for initiating wireless signal transmission to a wireless interface 444 connected to the remote central station 436.

Similar to the apparatus 100 shown in FIG. 3, the remote central station 436 may include a computer system 446 that collects and stores, on a storage device 448, information transmitted to the remote central station and processes (e.g., sorts) the received information such that the remote central station can alert personnel to internal conditions (e.g., pressure, flow rate, etc) of the pipeline 404 and external conditions (e.g., access obstructed) associated with one or more of the filter units 410, 412, 414, 416 and the flow meter 434. Once alerted, the personnel can take appropriate steps based on the internal (e.g., inspect the pipeline 404 for a pressure drop) and/or external (e.g., remove obstructions near an obstructed filter unit) conditions detected. Also, similar to the apparatus 100 shown in FIG. 3, the remote central station 436 may include wireless transmission and reception circuitry (e.g., RF circuits, antenna, etc.) for initiating wireless signal transmissions to a PDA 450 and/or a laptop computer 452, or other wireless devices (e.g., a cellular phone) so that personnel can quickly be alerted to the pressure and flow rate along the pipeline 404, obstructions of the filter units 410, 412, 414, 416 or flow meter 434, or other internal and external conditions by using these wireless devices.

Figure 7:
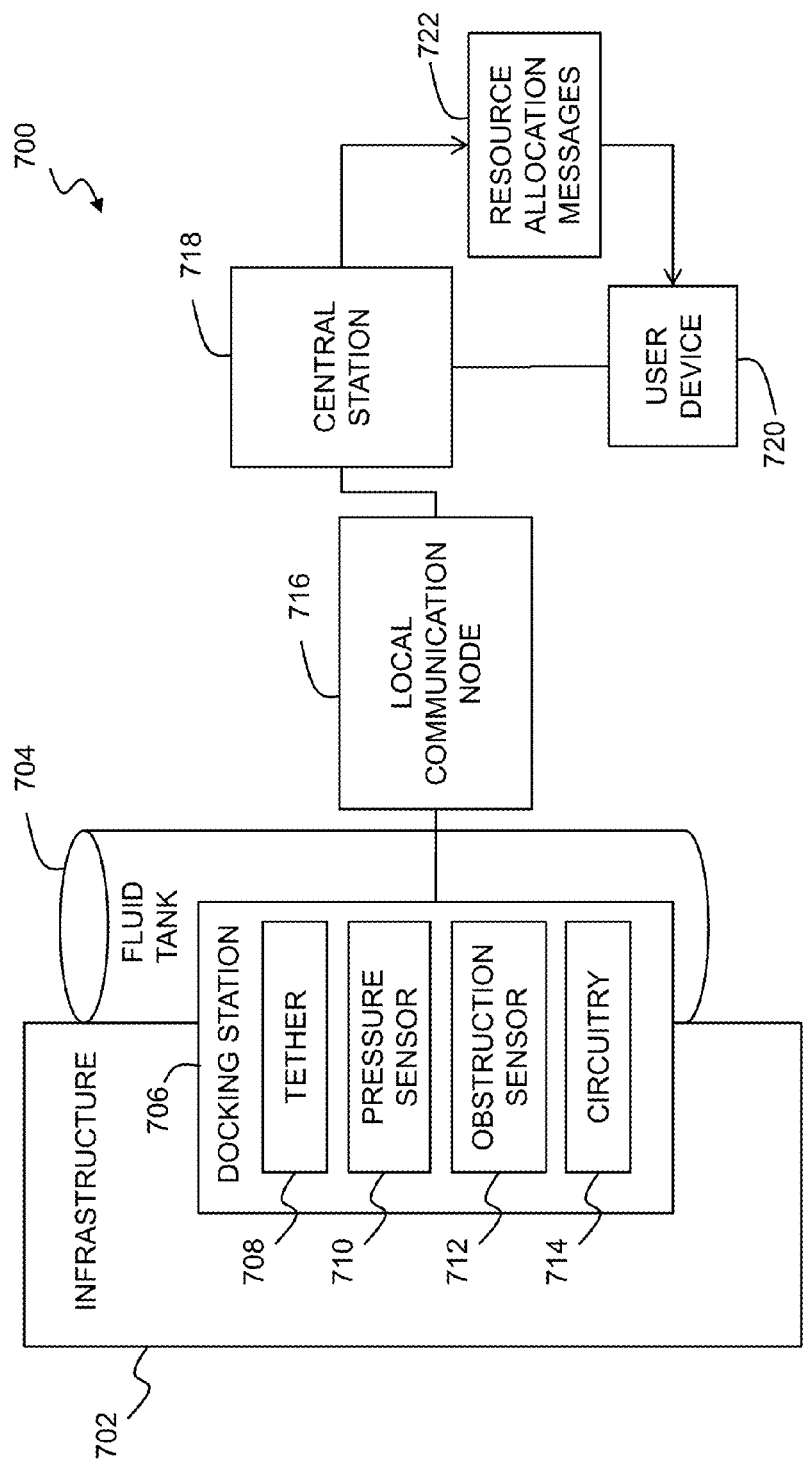
FIG. 7 is a block diagram of a generalized fluid tank monitoring system.

FIG. 7 is a block diagram of a generalized fluid tank monitoring system. The system 700 may include an item 702 of infrastructure, a fluid tank 704, a docking station 706, a tether 708, a pressure sensor 710, an obstruction sensor 712, and other circuitry 714, as well as a local communications node 716, a central station 718, and a user device 720. It will be understood that while a single item 702, fluid tank 704, docking station 706, local communication node 716, and central station 718 are depicted, any number of these components may be present in a deployment of a fluid tank monitoring system as contemplated herein. Thus in all instances, references to a single component should be understood to include one or more such components, unless a different meaning is explicitly provided or otherwise clear from the context.

The item 702 of hospital infrastructure may be any item of infrastructure. Thus for example, in a hospital (or more generally, a health care facility) context, the item 702 may be a wall of a room (where the fluid tank 704 might be mounted), a hospital bed for a patient (as generally described above), or a cart for mobile storage and deployment of oxygen tanks or the like. For example, hospitals generally maintain oxygen tanks in a tank cart that can be placed, e.g., near an elevator on one or more floors so that oxygen tanks can be regularly replaced in patient rooms or the like on some fixed or varying schedule. The systems and methods described herein may be usefully employed on such oxygen carts to improve management of oxygen tanks in a hospital.

The fluid tank 704 may be any tank for storing fluids including any of the fluid tanks described above. More generally, the fluid tank 704 may contain any fluid such as pressurized oxygen, fire extinguishing materials, industrial fluids or gasses, and so forth. Thus, while the following description emphasizes management of oxygen tanks in a hospital cart that is deployed, e.g., in a hospital or other health care facility, the fluid tank 704 may instead be a pressurized tank of gas or other fluid for welding, heating, fuel, fire extinguishing, and so forth.

The docking station 706 may be any hardware, electronics, and/or software for physically and electronically integrating the fluid tank 704 into the system 700 and/or the item 702 of infrastructure. In general, this includes any of the docking stations 706 described above. More generally, this may include any hooks, straps, shelves, retainers, separators, attachment points, or other physical hardware to retain the fluid tank 704 in a desired location relative to the item 702 of infrastructure. Thus, the docking station 706 may include hardware to wall-mount the fluid tank 704. The docking station 706 may also or instead include separators within a tank cart to retain the fluid tank 704 with a number of other fluid tanks in a desired location within a mobile carrier. It will be noted that the docking station 706 is depicted as spanning the item 702 of infrastructure and the fluid tank 704. This depiction is intended to include a docking station 706 that is separate from or integrated into the fluid tank 704 and/or the item 702 of infrastructure. Thus for example the docking station 706 may be entirely incorporated into the item 702 of infrastructure, and physically and electronically independent of the fluid tank 704, or the docking station 706 may include hardware and/or electronics integrated into the fluid tank 704, or some combination of these. Similarly, the tether 708, the pressure sensor 710, the obstruction sensor 712, and the other circuitry 714, as well as a local communications node 716, may optionally be partially or wholly integrated into the fluid tank 704, the docking station 706, and/or the item 702 of infrastructure without departing from the scope of this disclosure.

The tether 708 may include any physical or virtual tether as generally described above. The tether 708 generally monitors whether the fluid tank 704 is in an installed position, and provides corresponding signals which may be transmitted through the system 700 to the central station 718 for processing and subsequent action. Where the tether 708 is a physical tether, the tether 708 may provide supplemental functions such as maintaining wired communications with the docking station 706. Where the tether 708 is a virtual tether, a movement or deployment of the fluid tank 704 from an installed position may be monitored using, e.g., a Global Position System ("GPS") infrastructure, cellular telephony location-awareness technology, RFID technology, proximity sensing, or any other suitable techniques.

The pressure sensor 710 may detect fullness of the fluid tank 704. This may use any of the techniques described above, or any other suitable techniques for monitoring and reporting on the fullness of the fluid tank 704. For example, the pressure sensor 710 may employ one or more Reed switches, Hall Effect sensors, or the like to detect discrete limits of movement of a physical gauge such as a low or empty limit or a full limit, all as generally discussed above. In addition, any suitable sensors for detecting proxies for fullness (e.g., weight, internal pressure, wall strain, etc.) in a discrete or continuous manner may be suitably employed as the pressure sensor 710 and provide corresponding pressure or status data to the system 700. Thus the pressure sensor 710 may report a specific pressure, or may more generally report on a pressure-related state such as full, over-filled, empty, near empty, and the like. This may be signaled to a central station as a more general condition such as an out-of-range pressure condition requiring manual attention.

The obstruction sensor 712 may use sonar as described above, or any other image processing, spatial sensing, or other technology to detect obstructions to access to the fluid tank 704. The obstruction sensor 712 (and the other sensors/circuitry described herein) may feed sensor data to the system 700 for remote processing, or may process the sensor data locally and generate alerts or status information for the system 700.

The other circuitry 714 may include any sensor and/or processing circuitry for detecting internal conditions, external conditions, internal properties, external properties, and or status of the fluid tank 704. This may, for example, include GPS circuitry configured to determine a geographic location of the fluid tank 704 and either store this information in a local log or broadcast this information to the system 700. Location data may be correlated to specific locations within a health care facility or the like, and may be converted either locally or by the central station 720 into a human readable form such as "by the elevator on floor x" or "in room yyy." Similar results may be achieved using a cellular telephony network, a wireless local area network, proximity detection, and so forth, any of which may be used alone or in combination to obtain location information for the fluid tank 704. As another example, the other circuitry 714 may include a cellular telephony interface to augment other communications infrastructure used to report information about the fluid tank 704 to the system 700. The other circuitry 714 may also or instead include energy harvesting circuitry to extract ambient energy in vibrations, light, heat, and the like for use to recharge a local battery. The other circuitry 714 may also or instead include a camera and accompanying circuitry to capture and/or analyze images in an area around the fluid tank 704. In addition to permitting remote visual inspection of the fluid tank 704 or surrounding environment by a user, a still or video camera may capture images that can be processed to draw computer-generated inferences from any of the foregoing including without limitation inferences about pressure/fullness, deployment, obstruction, temperature (using, e.g., infrared imaging), and so forth.

The other circuitry 714 may also or instead include any other sensor or collection of sensors that might provide useful information in the context of a fluid tanks monitoring system, such as thermocouples to monitor temperature, strain gauges or other circuitry to measure weight of the fluid tank 704, or an inductive circuit to detect positional changes in a fluid tank 704 formed of metal. As with other circuitry described above, the other circuitry 714 may be disposed on the item 702 of infrastructure, the docking station 706, the fluid tank 704, or some combination of these.

By way of example, the other circuitry 714 may include circuitry to detect fluid flow rate from the fluid tank 704, or to detect which of a number of different couplings of a regulator is currently in use.

In general, the circuitry described above may be used to capture data on a variety of states of the fluid tank 716, any or all of which may be reported to the central station 720. For example, the circuitry may detect a pressure level in the tank, which information may be reported as a state back to the central station 720. In another aspect, the circuitry may detect tank usage, which may be reported as a general state (e.g., as an in-use indication or other information indicating that the fluid tank 716 is coupled to other medical equipment, or more generally that the tank is in use) or as specific state information such as a fluid flow rate from the tank. In another aspect, the state may include a proximity indicator, which may be based, e.g., on physical or virtual tethering, GPS data, wireless network signal strength analysis, RFID proximity detection, and so forth. In another aspect, the state may include a deployment indicator for the fluid tank 716. This may include data indicating usage or flow rate, data indicating coupling to other medical equipment, data indicating breaking of a tether, and so forth. In another aspect, the state may include an out of range pressure state. Thus a low pressure state may be signaled to the central station 720, e.g. at a predetermined fluid or pressure level. In one aspect, the predetermined level may be selected to provide a safe or useful continuous supply of fluid after detection of the state so that the fluid tank 716 can be replaced or refilled in a timely manner.

Other states that may be usefully monitored may include whether monitoring hardware is turned on and functioning properly, what devices a tank is connected to, relative degrees of fullness or emptiness, whether a monitoring tag or tether is connected, whether gauges are functioning properly, an orientation of a tank or of a regulator attached to a tank, orientation of a tank (using, e.g., inertial sensors), and so forth. All such states that might be usefully monitored by a central station as contemplated herein are intended to fall within the scope of this disclosure.

The local communication node 716 may be a communication node proximate to the docking station 706, such as in the same room, on a cart, or in some other location where short range communications can be maintained with the docking station 706 as generally described above. The local communication node 716 may also maintain communications with the central station 718 so that the central station 718 can monitor status of the fuel tank 704 as generally contemplated herein. In general, the local communication node 716 includes circuitry to maintain bi-directional communications with the docking station 706 and/or the central station 718 which may include wired communications, wireless communications, or some combination of these, all as generally described above.

The central station 718 may be any computer or group of computers with suitable storage, processing, and input/output capabilities to monitor and manage fluid tanks as described herein. On one hand, this includes monitoring signals from various fluid tanks such as the fluid tank 704 that are distributed throughout a facility. The central station 718 may also include a local keyboard, display, and mouse for operation by a user, who may monitor and administer the fluid tanks 704 and related operations as described herein.

A user device 720 such as a remote computer, cellular phone, smart phone, laptop computer, netbook computer, mobile device, or the like, may be employed to interface with the central station 718, such as to receive updates or to provide instructions, confirmations, or any other user input. In general, the user device 720 may receive resource allocation messages 722 from the central station 718 as described below. In this context, the user device 720 may be operated by building maintenance personnel, clinical personnel, third party vendors, emergency personnel, and any other users who might usefully receive resource allocation messages 722.

In one aspect, the systems described above may be employed to provide improved workflow for fluid container resource management.

For example, the central station 718 or other user device 720 may be implemented in a desktop computer at a nursing station, from where a nurse or other medical professional may monitor oxygen tanks. For purposes of the following discussion, this terminal is referred to as the user device 720, although any of the foregoing functionality may readily be implemented in the central station 718. The system 700 may periodically or continuously provide relevant monitoring information such as the oxygen level and location (either explicitly (e.g., by geographical coordinates) or implicitly (e.g., undisturbed from an installed position)) for oxygen tanks. The system 700 may concurrently track other fluid containers such as fire extinguishers, for which relevant information may include readiness information such as whether the fire extinguisher is at its installed position, whether the fire extinguisher is full, and whether access to the fire extinguisher is obstructed.

With respect to oxygen tanks, the system 700 may report on whether an oxygen tank is in place at each appropriate patient location, and whether each such oxygen tank has an appropriate amount of oxygen. From the user device 720, a user (e.g., a nurse) may visually monitor oxygen tank levels and decide when a new tank is required at a patient location. The central station 718 may also generate alerts to the user device 720, as well as any other user devices via text message, electronic mail, or any other suitable communication medium notifying the user of a low pressure or low fluid condition. In one aspect, the system 700 may monitor changes in pressure over time and predict an amount of time left until an empty condition is reached. This function may be particularly useful where numerous fluid tanks are being monitored so that appropriate human resources can be allocated to replenishment/replacement of tanks.

In another aspect, a user at the user device 720 may review an inventory of other oxygen tanks, such as a group of tanks on a nearby tank cart to determine where the nearest full oxygen tank can be found. The system 700 may automatically supplement this process by determining when some or all of the oxygen tanks on a cart are empty and generating another alert to appropriate hospital personnel. This latter alert may include an alert to a resource manager within the hospital who can replace the cart (or tanks on the cart) with full oxygen tanks from within the hospital. The system 700 may further analyze available resources to provide a specific resource allocation alert, such as an instruction to appropriate personnel to replace a tank cart on a specific floor or section of the hospital with a full cart, or to move a cart from one location in the hospital to another, or to add a number of full oxygen tanks to a specific cart. In another aspect, the alert may include an alert to a third party provider of supplies who can schedule a delivery to the hospital by truck or the like at an appropriate time. Thus in another aspect, a supplier may access data in the central station 718 to determine whether a delivery should be scheduled, and may receive proactive alerts when the system 700 identifies a low resource.

Thus in one aspect there is disclosed herein a system for monitoring of fluid tanks such as any of the systems described above, along with an interface at a user device for fluid container resource management. The interface may display status information obtained from monitoring a number of fluid containers such as location, deployment status, fullness, obstruction status, and so forth. The information may be displayed, for example, in the interface, such as within a graphical depiction of the hospital floor plan or in tabular or other useful form. The system may also include processing to generate alerts to appropriate personnel within or outside the hospital to assist with resource management, such as any of the alerts described above, along with a communications infrastructure to distribute alerts through any suitable communication medium.

In one aspect, all of the data gathered by the system may be stored in a searchable database and made available through a web portal or the like for remote access. This may include credential-based access, such as where a hospital administrator may see all data, hospital staff may see data related to their job function(s) or section of the hospital (e.g., a floor, wing, or department), and third party vendors may see any subset of relevant data. The web portal may support report generation, sorting, searching, and analysis (e.g., total resource usage, vendor response times to alerts, internal staff response time to alerts, and so forth).

Figure 8:
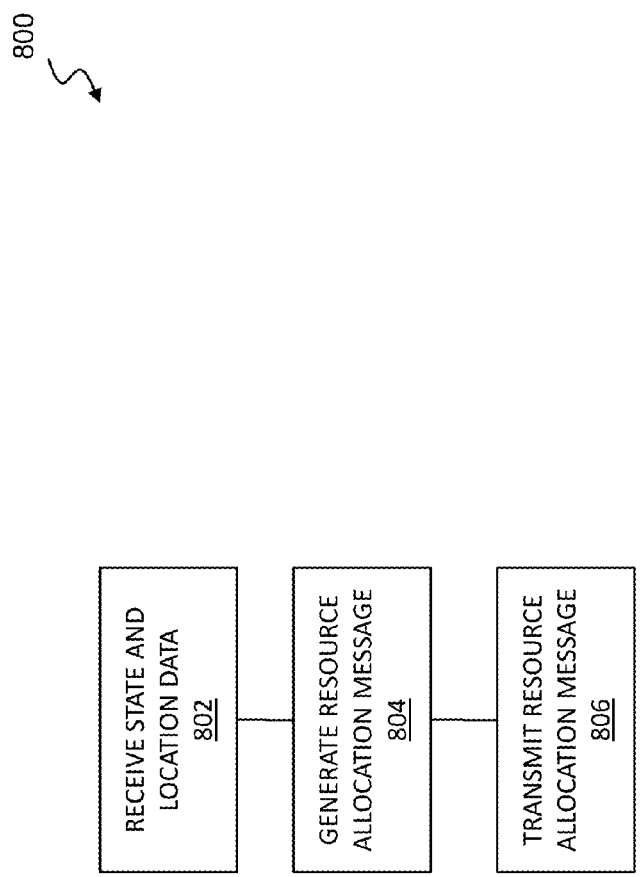
FIG. 8 shows a process for generating resource allocation messages.

FIG. 8 shows a process for generating resource allocation messages. In general, by gathering state and location information for a plurality of oxygen tanks (or more generally, fluid tanks) in a health care facility, a variety of techniques for automated resource management may be deployed. The central station 720 may receive state and location information, and may process this information with a processor or other conventional processing circuitry to generate resource allocation messages 722 relating to the oxygen tanks.

As shown in step 802, the process may begin with receiving state and location data from fluid tanks. The location data may be derived from GPS data, proximity sensing data, signal strength data, or the like received from various fluid tanks. The state data may include any of the state data described above, which may characterize a single state such as a type of fluid (e.g., oxygen) within the tank, a number of different states (e.g., fluid flow rate and an out-of-range pressure condition), or all available states. State and location data may be transmitted on any suitable schedule including, for example, when a state change occurs, on a predetermined fixed or variable schedule, when requested from the central station, or on any other continuous or periodic basis. In addition, each fluid tank may transmit all available data, or individual state data, or some combination of these, and each such transmission may be accompanied by an identifier for a particular one of the fluid tanks so that it can be correlated to other data for the fluid tank. It will be understood that using the architectures described above, a local communications node may relay data for one or more of the fluid tanks to the central station.

As shown in step 804, the central station may process the received data to generate resource allocation messages. A variety of useful resource allocation messages may be obtained based on data from fluid tanks.

For example, in one embodiment, the resource allocation message may include a request to a vendor to ship one or more additional oxygen tanks to the health care facility. This may be appropriate, for example, where tanks have a (low) out-of-pressure condition and tanks are filled at (or replaced by) a remote resource provider such as an oxygen supply company. Similarly, where tanks are refilled from a large oxygen reservoir at a health care facility, the resource allocation message may request pick up and refilling of the fluid tank. Such a message may usefully identify a specific location of the tank within the health care facility, and may further identify the tank by number or other identifier, although manual gauge inspection may be used as a suitable substitute for selecting the tank from among a number of tanks at the specific location. In another aspect, the resource allocation message may request replacement of a tank with an out of range pressure condition at a specific location within the health care facility. The central station may provide more detailed requests using information obtained from the fluid tanks. For example, where a health care facility provides an external storage container for fluid tanks, such as to store large numbers of tanks in a safe outside location, the resource allocation message requests transportation of an oxygen tank from the external storage container to a deployed location where the oxygen tank is to be used inside the health care facility. More generally, the message may request servicing of a fluid tank at a specific location, or the message may request movement of the fluid tank from one specific location to another specific location which includes moving from external storage to an internal location, from one internal location (e.g., local storage on a floor or wing of a health care facility or in a supply closet for same) to another internal location (e.g., to a crash cart, oxygen cart, or emergency room), or from an internal location to a second external location where the fluid tank can be retrieved and/or serviced by a vendor.

In another aspect, the resource allocation message may include an alert of a rules violation. A variety of safety regulations exist for handling of explosive or otherwise potentially hazardous fluids. For example, National Fire Protection Association standards (and numerous corresponding local codes) may limit the number of oxygen tanks that can be safely stored at a single indoor location. By detecting a number of fluid tanks in excess of a predetermined threshold for a particular fluid type at a single, specific location, a corresponding resource allocation message may be transmitted to various personnel including without limitation building management personnel, safety or emergency response personnel, or compliance or regulatory officials. Rules may also or instead relate to combinations of fluid types that can be collocated, a total volume of fluid that can be collocated, tank types for such fluids, and so forth. Any such rule that can be articulated and remotely evaluated can be monitored for rule compliance using the systems and methods described herein. Where tanks are uniquely identified, e.g., by an identification number or the like, other compliance rules concerning age, inspection, and so forth may also be enforced by storing related data for the tanks at the central station.

In one aspect, diagnostic information such as a suspected leak may be obtained from state information. Thus for example, an unexpected decrease in pressure or fluid level, or a non-zero flow rate from an undeployed tank, may result in an inference of a leak. Thus the resource allocation message may request replacement of an oxygen tank having a suspected leak, and the resource allocation message identifying a specific location of the oxygen tank within a health care facility.

The processor of the central station may also be programmed to predict resource allocation needs and generate resource allocation messages accordingly. Thus for example, the processor may be configured to generate a resource allocation message based on a prediction of an out of range pressure condition for an oxygen tank. This may be based on historical data for all oxygen tanks for the health care facility, or on specific data for one of the oxygen tanks, or some combination of these. For example, where state information includes information indicating a flow rate of oxygen from a tank, a prediction may be made (based on continuous flow rate assumption or historical data on use patterns) of when the tank will have an out of range pressure condition (e.g., low or empty). Similarly, when an oxygen tank is deployed on a crash cart or has some other deployed state, a prediction may be made of when replacement will be required, and a corresponding resource allocation message maybe generated.

As shown in step 806, a resource allocation message may be transmitted. This may include transmission to any suitable personnel such as any of the personnel described above. In one aspect, resource allocation messages may be broadcast to all personnel, or each resource allocation message may be selectively transmitted to one or more of a variety of available personnel according to predetermined rules, personal preferences, or some combination of these. Each message may identify a fluid tank by location and/or by a unique identifier, and may include human readable information describing a requested action. Each message may be transmitted through a variety of different media. For example, messages may be transmitted by Simple Messaging Service ("SMS") or other text messaging, by telephone (e.g., using voice synthesis or prerecorded messages), by electronic mail, by pager, by audible alert one at a suitably located work station, or using any other suitable communications medium or combination of media.

It will be appreciated that many of the above systems, devices, methods, processes, and the like may be realized in hardware, software, or any combination of these suitable for the data processing, data communications, and other functions described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, disclosed herein are computer program products comprising computer-executable code or computer-usable code that, when executing on one or more computing devices (such as the devices/systems described above), performs any and/or all of the steps described above. The code may be stored in a computer memory or other non-transitory computer readable medium, which may be a memory from which the program executes (such as internal or external random access memory associated with a processor), a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. While particular embodiments of the present invention have been shown and described, it will be apparent to those skilled in the art that various changes and modifications in form and details may be made therein without departing from the spirit and scope of the invention as defined by the following claims. This disclosure is intended to include all such variations and modifications that might fall within its scope, and should be interpreted in the broadest sense allowable by law.

What is claimed is:
1. A system comprising:
a plurality of oxygen tanks in a health care facility, each oxygen tank having a first circuit configured to determine a location of the oxygen tank, a second circuit configured to determine a state of the oxygen tank, and communications circuitry configured to transmit data indicative of the location and the state;
a central station coupled in a communicating relationship with each one of the plurality of oxygen tanks and receiving therefrom the data indicative of the location and the state for each one of the plurality of oxygen tanks; and a processor configured to analyze the data from each of the plurality of oxygen tanks, to predict resource allocation needs based on a combination of received data and historical data, and to generate a resource allocation message relating to at least one of the plurality of oxygen tanks based on the predicted resource allocation needs, wherein the processor is configured to generate the resource allocation message based on a prediction of an out of range pressure condition for one of the plurality of oxygen tanks and wherein the resource allocation message includes a request to a vendor to ship one or more additional oxygen tanks to the health care facility.

2. The system of claim 1 wherein the communicating relationship is a wireless communicating relationship.

3. The system of claim 1 wherein the state includes a pressure level.

4. The system of claim 1 wherein the state includes an in use indication.

5. The system of claim 1 wherein the state includes a fluid flow rate.

6. The system of claim 1 wherein the state includes a proximity.

7. The system of claim 1 wherein the state includes a deployment.

8. The system of claim 1 wherein the state includes an out of range pressure state.

9. The system of claim 1 wherein the first circuit includes a Global Positioning System.

10. The system of claim 1 wherein the first circuit includes a proximity sensor.

11. The system of claim 1 wherein the health care facility is a hospital.

12. The system of claim 1 wherein the resource allocation message includes an alert of a rules violation.

13. The system of claim 12 wherein the rules violation includes a number of the plurality of tanks in excess of a predetermined threshold at a location.

14. The system of claim 1 wherein the resource allocation message requests replacement of a tank with an out of range pressure condition at a specific location within the health care facility.

15. The system of claim 1 wherein the resource allocation message requests transportation of one of the plurality of oxygen tanks from an external storage container to a deployed location.

16. The system of claim 15 wherein the deployed location includes at least one of a crash cart, an oxygen cart, an emergency room, and a supply closet.

17. The system of claim 1 wherein the resource allocation message requests refilling of one of the plurality of oxygen tanks, the resource allocation message identifying a specific location of the one of the plurality of oxygen tanks within the health care facility.

18. The system of claim 1 wherein the resource allocation message requests replacement of one of the plurality of oxygen tanks having a suspected leak, the resource allocation message identifying a specific location of the one of the plurality of oxygen tanks.

19. The system of claim 1 wherein the state of the one of the plurality of oxygen tanks include information indicative of a flow rate of oxygen from the one of the plurality of oxygen tanks, and wherein the prediction is based on the state of the one of the plurality of oxygen tanks.

20. The system of claim 1 wherein the prediction is based on historical data received at the central station for the plurality of oxygen tanks.

* * * * *